United States Patent [19]
Toda

[11] Patent Number: 5,771,206
[45] Date of Patent: Jun. 23, 1998

[54] ELASTIC WAVE DEVICE FOR SENSING A TOUCH-POSITION

[76] Inventor: Kohji Toda, 1-49-18 Futaba, Yokosuka 239, Japan

[21] Appl. No.: 812,705

[22] Filed: Mar. 6, 1997

[51] Int. Cl.[6] .................................................. H01L 41/08
[52] U.S. Cl. ....................... 367/118; 367/907; 310/313 R
[58] Field of Search .................................... 367/118, 907; 310/313 R, 313 B, 313 D; 73/632; 333/193

[56] References Cited

U.S. PATENT DOCUMENTS 5,679,998  10/1997  Toda .................................... 310/313 R

*Primary Examiner*—Daniel T. Pihulic

[57] ABSTRACT

An elastic wave position-sensing device comprising a piezoelectric substrate, an input interdigital transducer T formed on an upper end surface of the piezoelectric substrate, and an output interdigital transducer R formed on the upper end surface of the piezoelectric substrate such that the finger direction of the interdigital transducer R is slanting to that of the interdigital transducer T by an angle $\alpha$. The thickness d of the piezoelectric substrate is smaller than an interdigital periodicity P of the interdigital transducer T. An interdigital periodicity $P_N$ along the vertical direction to the finger direction of the interdigital transducer R is equal to the product of the interdigital periodicity P and $\cos \alpha$. An overlap length $L_P$ along the finger direction of the interdigital transducer R is equal to the product of an overlap length L of the interdigital transducer T and $\sec \alpha$. When an electric signal is applied to the interdigital transducer T, the elastic wave is excited in the piezoelectric substrate, and is transduced to electric signals $E_j$ with phases $\theta_j$ by the interdigital transducer R, the phases $\theta_j$ corresponding to positions $F_j$ on the upper- or a lower end surface of the piezoelectric substrate. The total phase $\Sigma\theta_j$ made by the phases $\theta_j$, and the total electric signal $\Sigma E_j$ made by the electric signals $E_j$ are zero. The interdigital transducers T and R form minute propagation lanes $Z_j$, corresponding to the positions $F_j$, of the elastic wave in the piezoelectric substrate. If touching a position $F_x$ on a minute propagation lane $Z_x$, an electric signal E with a phase $\theta$ is delivered from the interdigital transducer R. The position $F_x$ corresponds to an electric signal $E_x$ with a phase $\theta_x$, the electric signal $\Sigma E_j$ minus the electric signal $E_x$ being equal to the electric signal E, the phase $\Sigma\theta_j$ minus the phase $\theta_x$ being equal to the phase $\theta$.

20 Claims, 15 Drawing Sheets

ELASTIC WAVE DEVICE FOR SENSING A TOUCH-POSITION

BACKGROUND OF THE INVENTION

1. Field of the Invention

The present invention relates to an elastic wave device for sensing a touch-position on an upper- or a lower end surface of a piezoelectric substrate having at least an elastic wave transducing unit.

2. Description of the Prior Art

An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and low power consumption, an accurate detection of a minute touch-position, and a small-sized circuit with a simple structure. Moreover, there are some problems on manufacturing, mass production and operation frequencies.

SUMMARY OF THE INVENTION

An object of the present invention is to provide an elastic wave position-sensing device capable of specifying a minute touch-position on an upper- or a lower end surface of a piezoelectric substrate with a high sensitivity and a quick response time.

Another object of the present invention is to provide an elastic wave position-sensing device excellent in manufacturing and mass-production.

A still other object of the present invention is to provide an elastic wave position-sensing device operating under low power consumption with low voltage.

A still further object of the present invention is to provide an elastic wave position-sensing device having a small-sized circuit with a simple structure which is very light in weight.

According to one aspect of the present invention there is provided an elastic wave position-sensing device comprising a piezoelectric substrate having an upper- and a lower end surfaces running perpendicular to the direction of the thickness d thereof, an input interdigital transducer T formed on the upper end surface of the piezoelectric substrate, and an output interdigital transducer R formed on the upper end surface of the piezoelectric substrate such that the finger direction of the interdigital transducer R is slanting to that of the interdigital transducer T by an angle $\alpha$. The thickness d of the piezoelectric substrate is smaller than an interdigital periodicity P of the interdigital transducer T. An interdigital periodicity $P_N$ along the vertical direction to the finger direction of the interdigital transducer R is equal to the product of the interdigital periodicity P and cos $\alpha$. An overlap length $L_P$ along the finger direction of the interdigital transducer R is equal to the product of an overlap length L of the interdigital transducer T and sec $\alpha$.

When an electric signal having a frequency approximately corresponding to the interdigital periodicity P is applied to the interdigital transducer T, the elastic wave having the wavelength approximately equal to the interdigital periodicity P is excited in the piezoelectric substrate effectively. The elastic wave is transduced to electric signals $E_j$ (j=1, 2, ..., $\chi$) with phases $\theta_j$ (j=1, 2, ..., $\chi$) by the interdigital transducer R, the phases $\theta_j$ corresponding to positions $F_j$ (=1, 2, ..., $\chi$) on the upper- or lower end surface of the piezoelectric substrate, each electric signal $E_j$ having a frequency approximately corresponding to the interdigital periodicity P. The total phase $\Sigma\theta_j$ made by the phases $\theta_j$ is zero, and the total electric signal $\Sigma E_j$ made by the electric signals $E_j$ is also zero. Thus, the total electric signal $\Sigma E_j$ is not able to be detected at the interdigital transducer R. The interdigital transducers T and R form minute propagation lanes $Z_j$ (j=1, 2, ..., $\chi$) of the elastic wave in the piezoelectric substrate, the minute propagation lanes $Z_j$ corresponding to the positions $F_j$. If touching a position $F_x$ on a minute propagation lane $Z_x$, an electric signal E with a phase $\theta$ is delivered from the interdigital transducer R, the position $F_x$ corresponding to an electric signal $E_x$ with a phase $\theta_x$, the total electric signal $\Sigma E_j$ minus the electric signal $E_x$ being equal to the electric signal E, the total phase $\Sigma\theta_j$ minus the phase $\theta_x$ being equal to the phase $\theta$.

According to another aspect of the present invention there is provided an elastic wave position-sensing device comprising the piezoelectric substrate, an input interdigital transducer M in place of the interdigital transducer T formed on the upper end surface of the piezoelectric substrate, an earth electrode G formed on the lower end surface of the piezoelectric substrate and corresponding with the interdigital transducer M, the output interdigital transducer R, and a phase shifter S including at least a coil $L_1$. The thickness d of the piezoelectric substrate is smaller than an interdigital periodicity P of the interdigital transducer M. The interdigital transducer M consists of two electrodes $M_1$ and $M_2$ and has two kinds of distances between one electrode finger of the electrode $M_1$ and two neighboring electrode fingers of the electrode $M_2$, a shorter distance being xP.

When two electric signals $V_1$ and $V_2$, with the phase difference $2\pi y$, are applied between the electrode $M_1$ and the earth electrode G and between the electrode $M_2$ and the earth electrode G, via the phase shifter S, respectively, an unidirectional elastic wave having the wavelength approximately equal to the interdigital periodicity P is excited in the piezoelectric substrate effectively, on condition that x<½ in the shorter distance xP of the interdigital transducer M, and x+y=±½ in the phase difference $2\pi y$. The unidirectional elastic wave is transduced to electric signals $E_j$ with phases $\theta_j$ by the interdigital transducer R, the phases $\theta_j$ corresponding to the positions $F_j$. The interdigital transducers M and R form minute propagation lanes $Z_j$ of the elastic wave in the piezoelectric substrate. If touching a position $F_x$ on a minute propagation lane $Z_x$, an electric signal E with a phase θ is delivered from the interdigital transducer R.

According to another aspect of the present invention there is provided an elastic wave position-sensing device comprising the piezoelectric substrate, two elastic wave transducing units X and Y, and a controlling system connected with the elastic wave transducing units X and Y. Each elastic wave transducing unit consists of an input interdigital transducer To formed on the upper end surface of the piezoelectric substrate, N input interdigital transducers $T_i$ (i=1, 2, . . ., N) formed on the upper end surface of the piezoelectric substrate, an output interdigital transducer $R_o$ opposed to the interdigital transducer $T_o$ on the upper end surface of the piezoelectric substrate and placed such that the finger direction of the interdigital transducer $R_o$ runs parallel with that of the interdigital transducer $T_o$, and at least two output interdigital transducers $R_{i1}$ and $R_{i2}$ (i=1, 2, . . . , N) opposed to each interdigital transducer $T_i$ on the upper end surface of the piezoelectric substrate and placed such that the finger direction of the interdigital transducers $R_{i1}$ and $R_{i2}$ is slanting to that of the interdigital transducer $T_i$ by an angle α, respectively. The thickness d of the piezoelectric substrate is smaller than an interdigital periodicity P of the interdigital transducers $T_o$, $T_i$ and $R_o$. An interdigital periodicity $P_N$ along the vertical direction to the finger direction of the interdigital transducers $R_{i1}$ and $R_{i2}$ is equal to the product of the interdigital periodicity P and cos α. The sum of an overlap length $L_P$ along the finger direction of the interdigital transducer $R_{i1}$ and that of the interdigital transducer $R_{i2}$ is approximately equal to the product of an overlap length L of the interdigital transducer $T_i$ and sec α.

When an electric signal having a frequency approximately corresponding to the interdigital periodicity P is applied to the interdigital transducers $T_o$ and $T_i$, respectively, the elastic wave having the wavelength approximately equal to the interdigital periodicity P is excited in the piezoelectric substrate effectively. The elastic wave excited by the interdigital transducer $T_o$ is transduced to an electric signal with a phase $θ_{base}$ by the interdigital transducer $R_o$. The elastic wave excited by the interdigital transducer $T_i$ is transduced to electric signals $E_j$ with phases $θ_j$ by each of the interdigital transducers $R_{i1}$ and $R_{i2}$, the phases $θ_j$ corresponding to the positions $F_j$, each electric signal $E_j$ having a frequency approximately corresponding to the interdigital periodicity P. The interdigital transducers $T_i$ and $R_{i1}$ form N propagation lanes $D_{i1}$ (i=1, 2, . . . , N) of the elastic wave in the piezoelectric substrate. The interdigital transducers $T_i$ and $R_{i2}$ form N propagation lanes $D_{i2}$ (i=1, 2, . . . , N) of the elastic wave in the piezoelectric substrate. Two neighbors of the propagation lanes $D_{i1}$ and $D_{i2}$ are closed or partially overlapping each other. The propagation lanes $D_{i1}$ and $D_{i2}$ of the elastic wave transducing unit X and that of the elastic wave transducing unit Y are vertical to each other. Each propagation lane consists of minute propagation lanes $Z_j$ corresponding to the positions $F_j$. If touching a position $F_x$ on a minute propagation lane $Z_x$ out of the propagation lanes $D_{i1}$ and $D_{i2}$, an electric signal E with a phase θ is delivered from one of the interdigital transducers $R_{i1}$ and $R_{i1\ 2}$, the position $F_x$ corresponding to an electric signal $E_x$. with a phase $θ_x$. The controlling system senses a touch with a finger or others on the position $F_x$ by an appearance of the electric signal E at the one of the interdigital transducers $R_{i1}$ and $R_{i2}$, and finds the position $F_x$ by detecting the one, delivering the electric signal E, of the interdigital transducers $R_{i1}$ and $R_{i2}$, and by evaluating a difference between the phases θ and $θ_{base}$.

According to another aspect of the present invention there are provided N switches $W_i$ (i=1, 2, . . . , N) corresponding to the interdigital transducers $T_i$, an output terminal of each switch $W_i$ being connected with an input terminal of each interdigital transducer $T_i$. Output terminals of the interdigital transducers $R_{i1}$ are connected with each other at an output point $Q_1$. Output terminals of the interdigital transducers $R_{i2}$ are connected with each other at an output point $Q_2$. The controlling system turns on and off the switches $W_i$ with a fixed period in turn, senses a touch on the position $F_x$ by an appearance of the electric signal E at one of the output points $Q_1$ and $Q_2$, and finds the position $F_x$ by detecting the one, delivering the electric signal E, of the output points $Q_1$ and $Q_2$, by choosing a closed one out of the switches $W_i$ when the electric signal E appears, and by evaluating the difference between the phases θ and $θ_{base}$.

According to another aspect of the present invention there is provided an amplifier $A_x$, an input terminal of the interdigital transducer $R_o$ of the elastic wave transducing unit X being connected with each input terminal of the interdigital transducer $T_o$ of the elastic wave transducing units X and Y via the amplifier $A_x$. The interdigital transducers $T_o$ and $R_o$ in the elastic wave transducing unit X, a propagation lane of an elastic wave between the interdigital transducers $T_o$ and $R_o$ in the elastic wave transducing unit X, and the amplifier $A_x$ form an oscillator.

According to another aspect of the present invention there is provided an elastic wave position-sensing device comprising the piezoelectric substrate, two elastic wave transducing units X and Y, and a controlling system connected with the elastic wave transducing units X and Y. Each elastic wave transducing unit consists of the interdigital transducer $T_o$, N input interdigital transducers $M_i$ (i=1, 2, . . . , N) in place of the interdigital transducers $T_i$ formed on the upper end surface of the piezoelectric substrate, the interdigital transducer $R_o$, at least two interdigital transducers $R_{i1}$ and $R_{i2}$, the phase shifter S, and N earth electrodes $G_i$ (i=1, 2, . . . , N) formed on the lower end surface of the piezoelectric substrate and corresponding with the interdigital transducers $M_i$, respectively. The thickness d of the piezoelectric substrate is smaller than an interdigital periodicity P of the interdigital transducers $T_o$, $M_i$ and $R_o$.

When the electric signal is applied to the interdigital transducers $T_o$, the elastic wave is excited in the piezoelectric substrate, and is transduced to an electric signal with a phase $θ_{base}$ by the interdigital transducer $R_o$. When an electric signal $V_1$ is applied between the electrode $M_{i-1}$ and the earth electrode $G_i$, and another electric signal $V_2$ is applied between the electrode $M_{i-2}$ and the earth electrode $G_i$, via the phase shifter S, an unidirectional elastic wave is excited in the piezoelectric substrate, on condition that x<½ in a shorter distance xP of the two kinds of distances between one electrode finger of the electrode $M_{i-1}$ and two neighboring electrode fingers of the electrode $M_{i-2}$, and x+y=±½ in a phase difference 2πy between the electric signals $V_1$ and $V_2$. The elastic wave excited by each interdigital transducer $M_i$ and each earth electrode $G_i$ is transduced to electric signals $E_j$ with phases $θ_j$ by each of the interdigital transducers $R_{i1}$ and $R_{i2}$, the phases $θ_j$ corresponding to the positions $F_j$, each electric signal $E_j$ having a frequency approximately corresponding to the interdigital periodicity P. The interdigital transducers $M_i$ and $R_{i1}$ form N propagation lanes $D_{i1}$, of the elastic wave in the piezoelectric substrate. The interdigital transducers $M_i$ and $R_{i2}$ form N propagation lanes $D_{i2}$ of the elastic wave in the piezoelectric substrate. Each propagation lane consists of minute propagation lanes $Z_j$ corresponding to the positions $F_j$. If touching a position $F_x$ on a minute propagation lane $Z_x$ out of the propagation lanes $D_{i1}$ and $D_{i2}$, an electric signal E with a phase θ is delivered from one of the interdigital transducers $R_{i1}$ and $R_{i2}$, the position $F_x$ corresponding to an electric signal $E_x$ with a phase $θ_x$. The controlling system senses a touch with a finger or others on the position $F_x$ by an appearance of the electric signal E at the one of the interdigital transducers $R_{i1}$ and $R_{i2}$, and finds the position $F_x$ by detecting the one, delivering the electric signal E, of the interdigital transducers $R_{i1}$ and $R_{i2}$, and by evaluating a difference between the phases θ and $θ_{base}$.

According to other aspect of the present invention there is provided a piezoelectric substrate made of a piezoelectric ceramic, the polarization axis thereof being parallel to the thickness direction thereof.

According to a further aspect of the present invention there is provided a piezoelectric substrate made of a piezoelectric polymer such as PVDF and so on.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
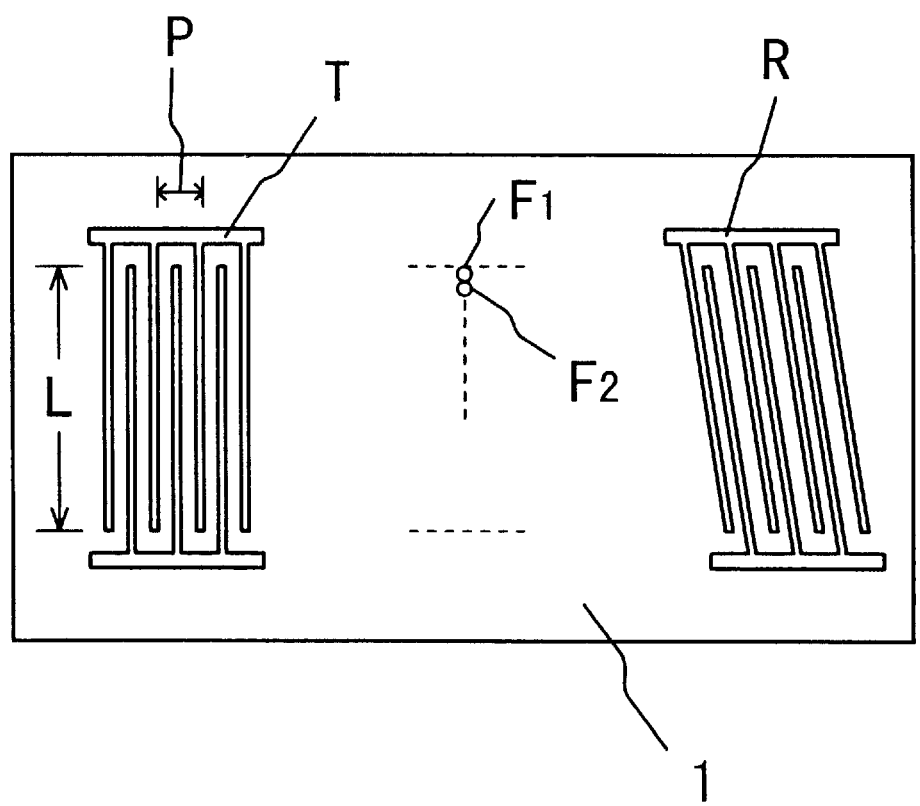
FIG. 1 shows a plan view of an elastic wave position-sensing device according to a first embodiment of the present invention.

FIG. 1 shows a plan view of an elastic wave position-sensing device according to a first embodiment of the present invention. The elastic wave position-sensing device comprises piezoelectric substrate (1) having an upper- and a lower end surfaces running perpendicular to the direction of the thickness d thereof, input interdigital transducer (T) formed on the upper end surface of piezoelectric substrate (1), and output interdigital transducer (R) formed on the upper end surface of piezoelectric substrate (1). Piezoelectric substrate (1), of which material is a piezoelectric ceramic, has a dimension of 350 μm in thickness. Interdigital transducers (T and R), made from aluminium thin film, consist of ten finger pairs, respectively. Interdigital transducer (T) has a common-type construction with an interdigital periodicity P of 400 μm and an overlap length L of 12 mm. The finger direction of interdigital transducer (R) is not parallel to that of interdigital transducer (T). In the elastic wave position-sensing device, it is possible to sense a touch with a finger or others on one of positions $F_j$ (j=1, 2, ..., χ) on the upper- or lower end surface of piezoelectric substrate (1). FIG. 1 shows the positions $F_j$ on only the upper end surface of piezoelectric substrate (1).

Figure 2:
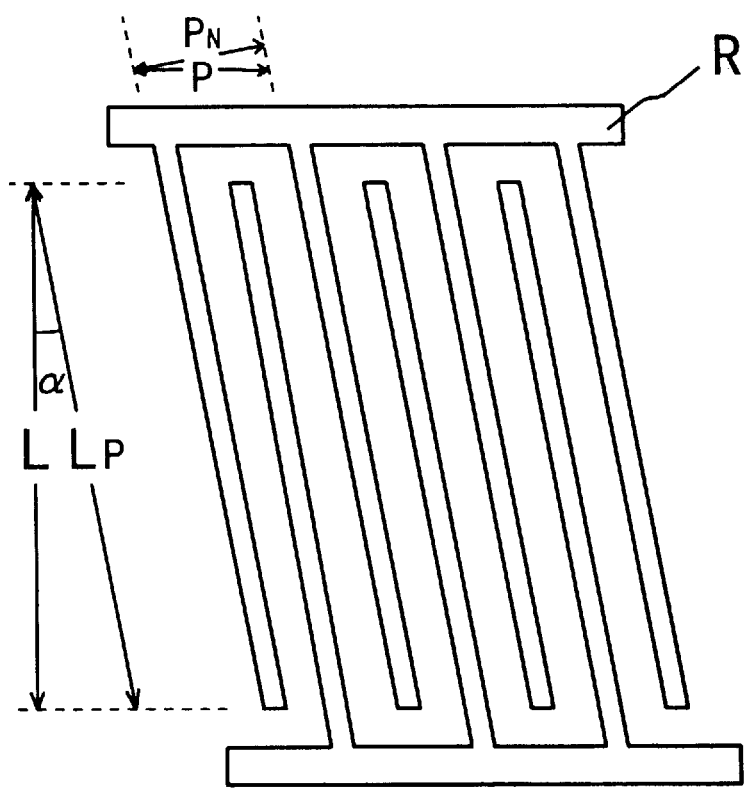
FIG. 2 shows a plan view of interdigital transducer (R).

FIG. 2 shows a plan view of interdigital transducer (R). Interdigital transducer (R) is located such that the finger direction thereof is slanting to that of interdigital transducer (T) by an angle α, an interdigital periodicity $P_N$ along the vertical direction to the finger direction of interdigital transducer (R) being equal to the product of the interdigital periodicity P and cos α. An overlap length $L_P$ along the finger direction of interdigital transducer (R) is equal to the product of the overlap length L of interdigital transducer (T) and sec α.

Figure 3:
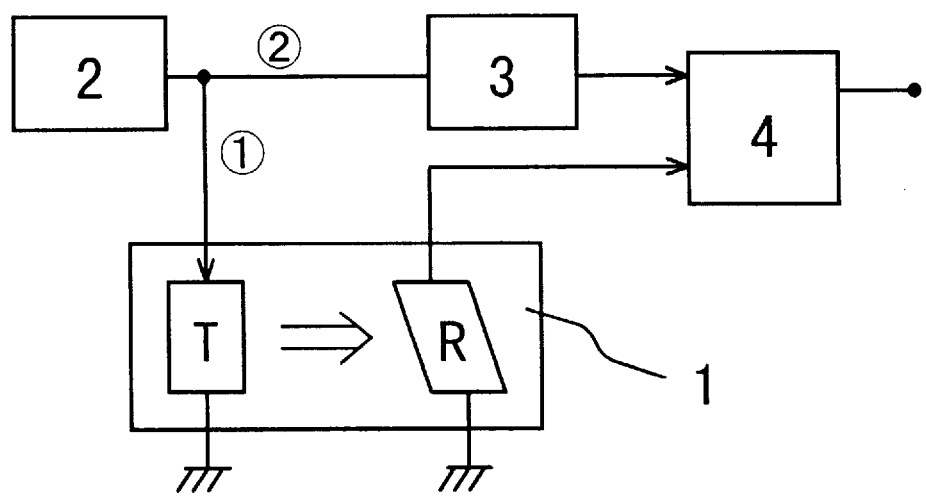
FIG. 3 shows a diagram of a driving circuit of the elastic wave position-sensing device in FIG. 1.

FIG. 3 shows a diagram of a driving circuit of the elastic wave position-sensing device in FIG. 1. The driving circuit includes oscillator (2), attenuator (3) and phase comparator (4). An electric signal ① is transmitted from oscillator (2) to interdigital transducer (T). On the other hand, an electric signal ② is transmitted from oscillator (2) to phase comparator (4) via attenuator (3). Because the thickness d of piezoelectric substrate (1) is smaller than the interdigital periodicity P, the elastic wave having the wavelength approximately equal to the interdigital periodicity P is excited in piezoelectric substrate (1) effectively when the electric signal ① having a frequency approximately corresponding to the interdigital periodicity P is applied to interdigital transducer (T). In addition, because of using a piezoelectric ceramic having the polarization axis parallel to the thickness direction thereof, as piezoelectric substrate (1), the transducing efficiency from the electric signal ① to the elastic wave increases. Moreover, it is possible to increase the transducing efficiency from the electric signal ① to the elastic wave, if using a piezoelectric polymer such as PVDF and so on, as piezoelectric substrate (1).

An arrow on piezoelectric substrate (1) in FIG. 3 shows the transmitting direction of the elastic wave. Interdigital transducers (T and R) form minute propagation lanes $Z_j$ (j=1, 2, ..., χ) of the elastic wave in piezoelectric substrate (1), the minute propagation lanes $Z_j$ corresponding to the positions $F_j$. The elastic wave is transduced to electric signals $E_j$ (j=1, 2, ..., χ) with phases $θ_j$ (j=1, 2, ..., χ) by interdigital transducer (R), the phases $θ_j$ corresponding to the positions $F_j$, respectively. Each electric signal $E_j$ has a frequency approximately corresponding to the interdigital periodicity P. The total phase $Σθ_j$ made by the phases $θ_j$ is zero, and the total electric signal $ΣE_j$ made by the electric signals $E_j$ is also zero. Thus, the total electric signal $ΣE_j$ is not able to be detected at interdigital transducer (R). However, if touching a position $F_x$, out of the positions $F_j$ in FIG. 1, on a minute propagation lane $Z_x$ out of the minute propagation lanes $Z_j$, an electric signal E with a phase θ is delivered from interdigital transducer (R). In short, the electric signal E is delivered from interdigital transducer (R) only when touching the position $F_x$, causing a low voltage operation and low power consumption. The position $F_x$ corresponds to an electric signal $E_x$ with a phase $θ_x$. In this time, the total electric signal $ΣE_j$ minus the electric signal $E_x$ is equal to the electric signal E, and the total phase $Σθ_j$ minus the phase $θ_x$ is equal to the phase θ. In other words, only the elastic wave in the minute propagation lane $Z_x$ is disappeared and is not transduced to the electric signal $E_x$ when touching the position $F_x$. As a result, the electric signal E being equal to the total electric signal $ΣE_j$ minus the electric signal $E_x$ is delivered from interdigital transducer (R). Thus, the position $F_x$ is detected from the phase $θ_x$ corresponding to the electric signal $E_x$. The electric signal transmitted from oscillator (2) to phase comparator (4) via attenuator (3) has the phase approximately equal to the total phase $Σθ_j$, that is zero. Accordingly, phase comparator (4) detects a difference between the phase of the electric signal transmitted from oscillator (2) to phase comparator (4) and the phase θ of the electric signal E delivered from interdigital transducer (R), the phase difference corresponding to the phase $θ_x$.

Figure 4:
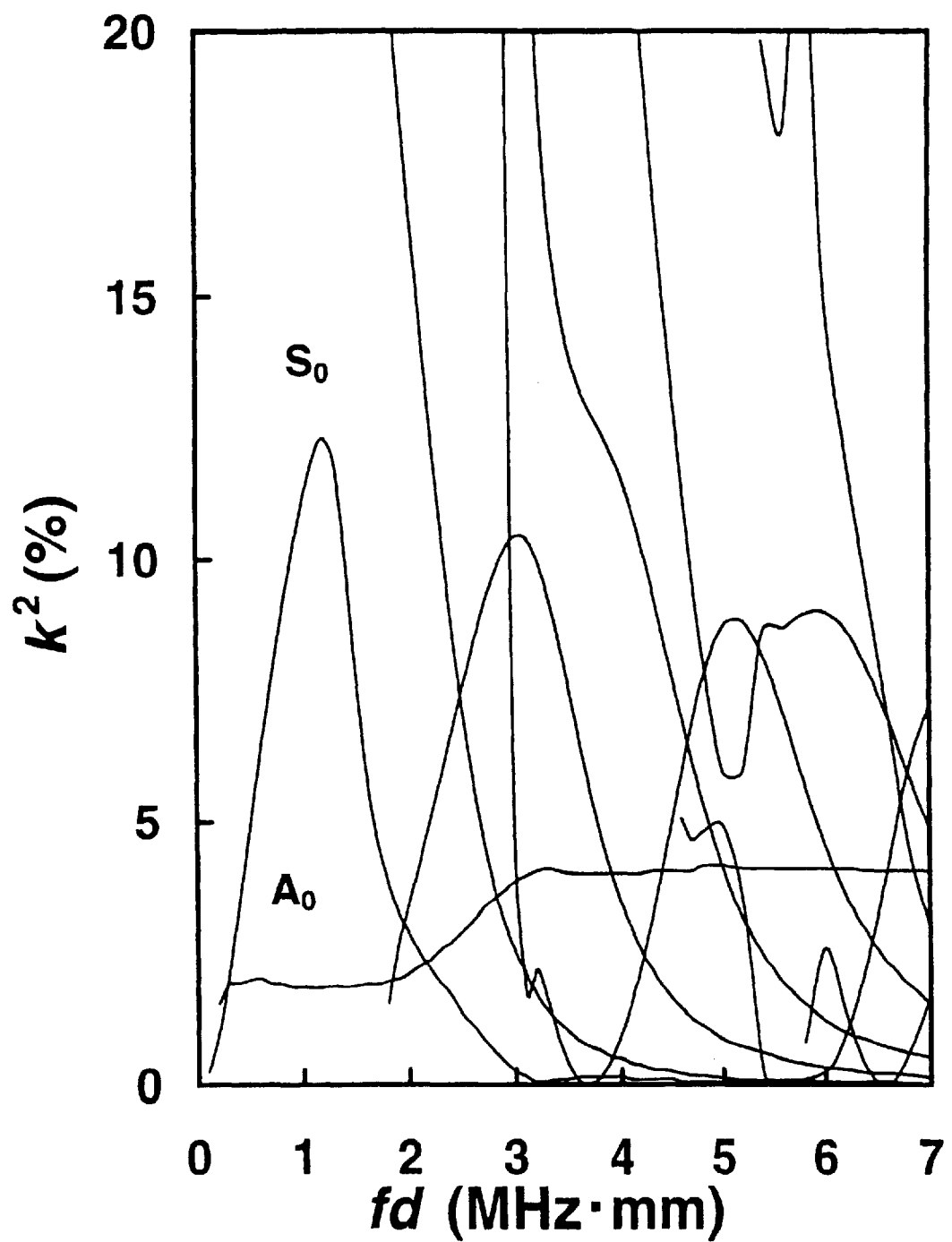
FIG. 4 shows a relationship between the $k^2$ value calculated from the difference between the phase velocity under electrically opened condition and that under electrically shorted condition of piezoelectric substrate (1), and the fd value.

FIG. 4 shows a relationship between the electromechanical coupling constant $k^2$ calculated from the difference between the phase velocity under electrically opened condition and that under electrically shorted condition of piezoelectric substrate (1), and the product fd of the frequency f of the elastic wave and the thickness d of piezoelectric substrate (1). The velocities of a shear- and a longitudinal waves are 2450 m/s and 4390 m/s, respectively, in piezoelectric substrate (1) alone. An electric energy applied to interdigital transducer (T) is most easily transduced to the second mode elastic wave when the fd value is approximately 1.3 MHz·mm, then the $k^2$ value is approximately 12.4% being the maximum value. It is clear that the $k^2$ value of 12.4% is worthy in comparison that a crystallized $LiNbO_3$ used as a popular piezoelectric body for exciting a surface acoustic wave generally has the $k^2$ value of approximately 5%.

Figure 5:
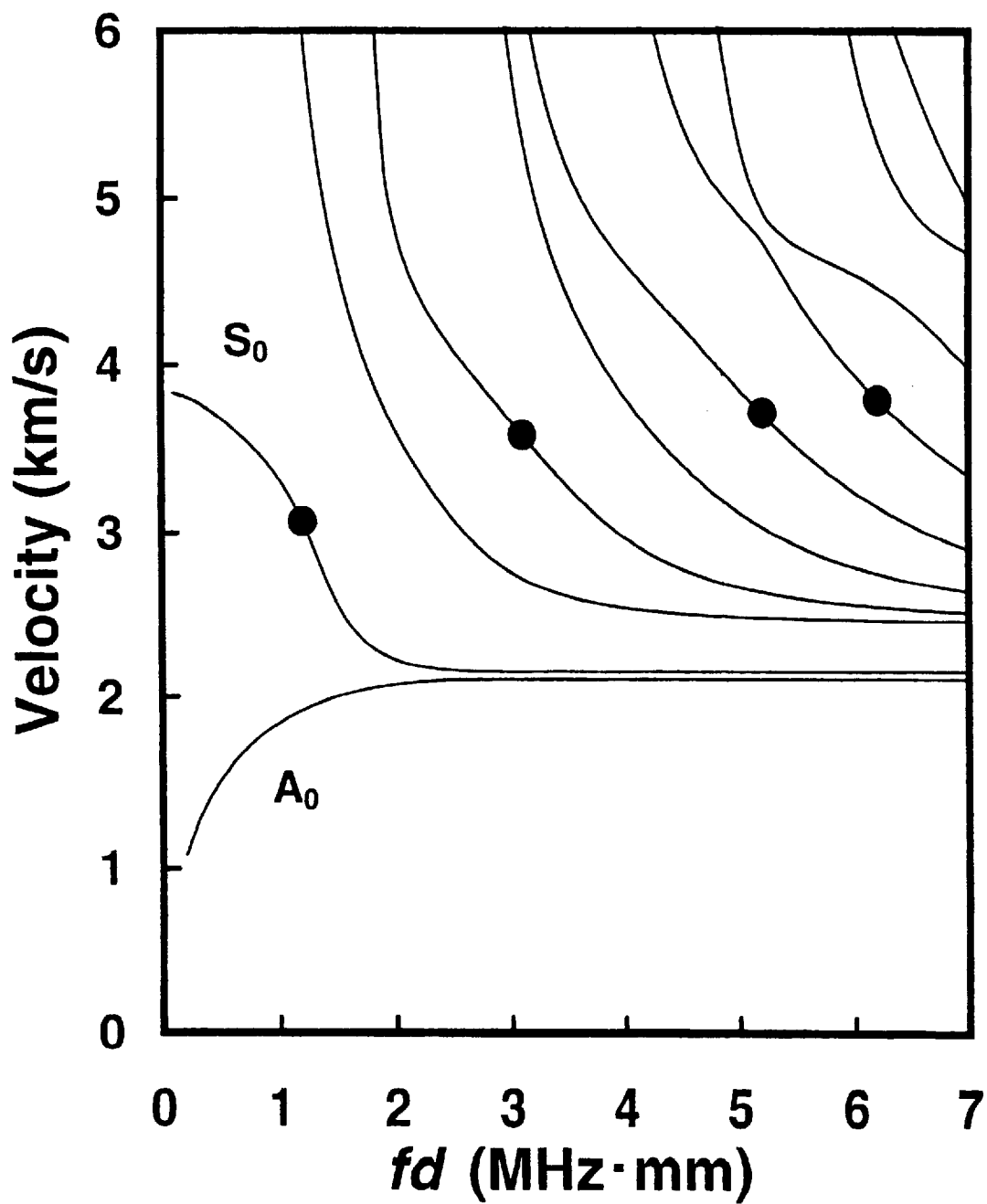
FIG. 5 shows a relationship between the phase velocity of the elastic wave for each mode in piezoelectric substrate (1), and the fd value.

FIG. 5 shows a relationship between the phase velocity of the elastic wave for each mode in piezoelectric substrate (1), and the fd value. The fd value at each mark ● has the maximum $k^2$ value where an electric energy applied to interdigital transducer (T) is most easily transduced to the elastic wave, the maximum $k^2$ value being obtained from FIG. 4. The phase velocity of the elastic wave at each mark ● is approximately 3500 m/s.

Figure 6:
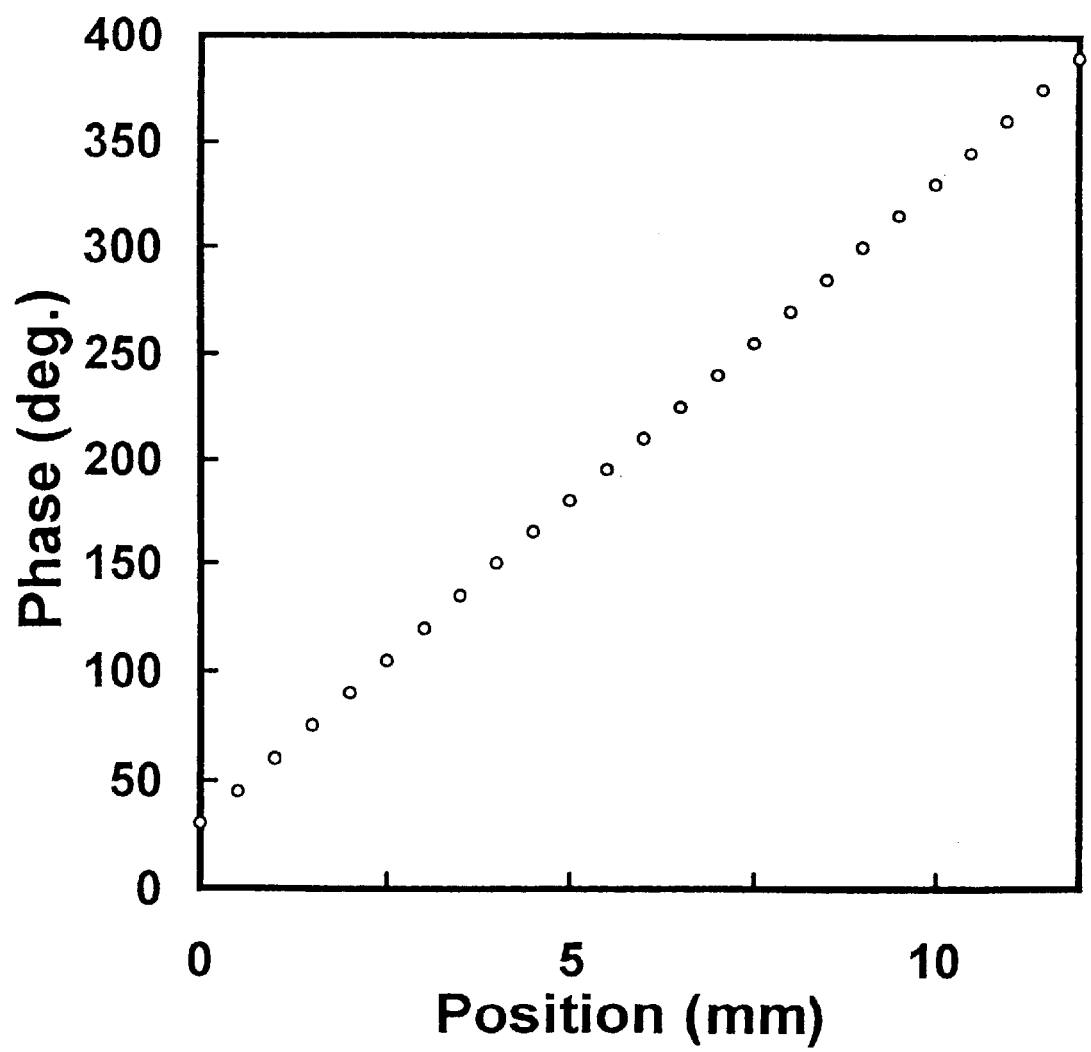
FIG. 6 shows a relationship between a touch-position $F_x$ and a phase $θ_x$ detected by phase comparator (4).

FIG. 6 shows a relationship between a touch-position $F_x$ and a phase $θ_x$ detected by phase comparator (4). The distance between the touch-position $F_x$ and a touch-position $F_{x+1}$ is 0.5 mm. There exists a linear relationship between the touch-position $F_x$ and the phase $θ_x$.

Figure 7:
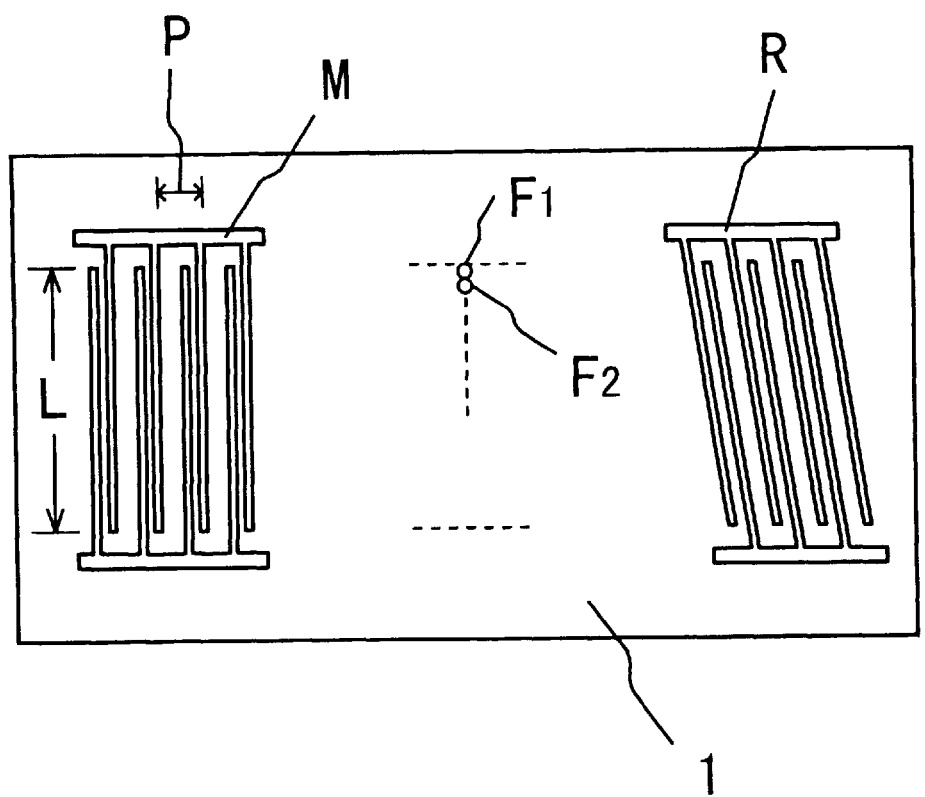
FIG. 7 shows a plan view of an elastic wave position-sensing device according to a second embodiment of the present invention.

FIG. 7 shows a plan view of an elastic wave position-sensing device according to a second embodiment of the present invention. The elastic wave position-sensing device comprises piezoelectric substrate (1), input interdigital transducer (M) formed on the upper end surface of piezoelectric substrate (1), output interdigital transducer (R), earth electrode (G), and phase shifter (S). In FIG. 7, earth electrode (G) and phase shifter (S) are not drawn. Interdigital transducer (M), made from aluminium thin film, consists of ten finger pairs and has an interdigital periodicity P of 400 μm and an overlap length L of 12 mm. Interdigital transducer (R) is, as shown in FIG. 2, located such that the finger direction thereof is slanting to that of interdigital transducer (M) by an angle α, an interdigital periodicity PN along the vertical direction to the finger direction of interdigital transducer (R) being equal to the product of the interdigital periodicity P and cos α. An overlap length $L_P$ along the finger direction of interdigital transducer (R) is equal to the product of the overlap length L of interdigital transducer (T) and sec α. In the elastic wave position-sensing device, it is possible to sense a touch with a finger or others on one of positions $F_j$ (j=1, 2, . . . , χ) on the upper- or lower end surface of piezoelectric substrate (1). FIG. 7 shows the positions $F_j$ on only the upper end surface of piezoelectric substrate (1).

Figure 8:
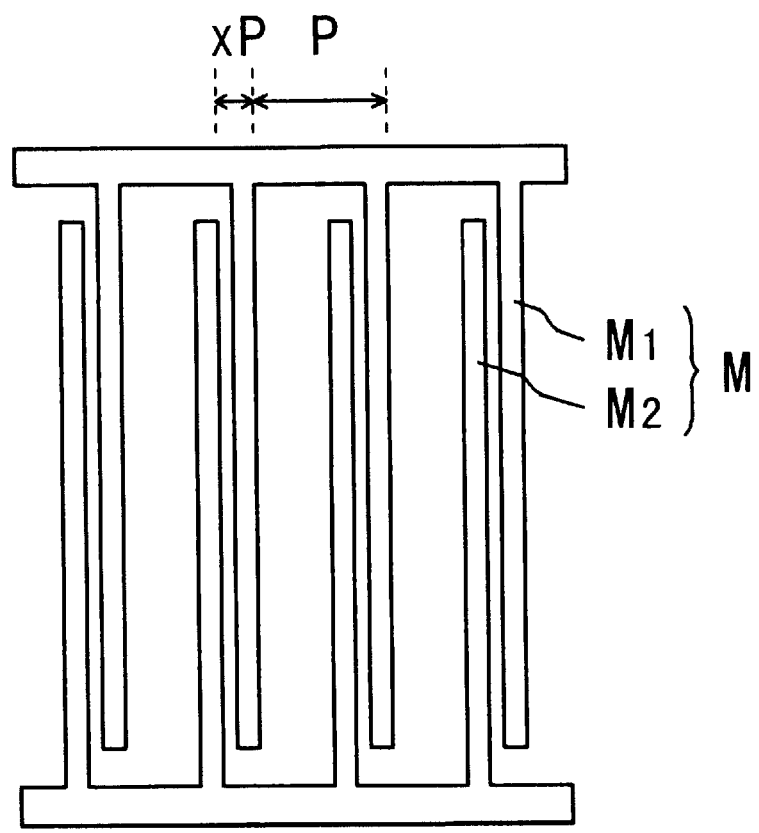
FIG. 8 shows a plan view of interdigital transducer (M).

FIG. 8 shows a plan view of interdigital transducer (M). Interdigital transducer (M) consists of two electrodes ($M_1$ and $M_2$), and has two kinds of distances between one electrode finger of electrode ($M_1$) and two neighboring electrode fingers of electrode ($M_2$), a shorter distance xP of the two kinds of distances being 100 μm.

Figure 9:
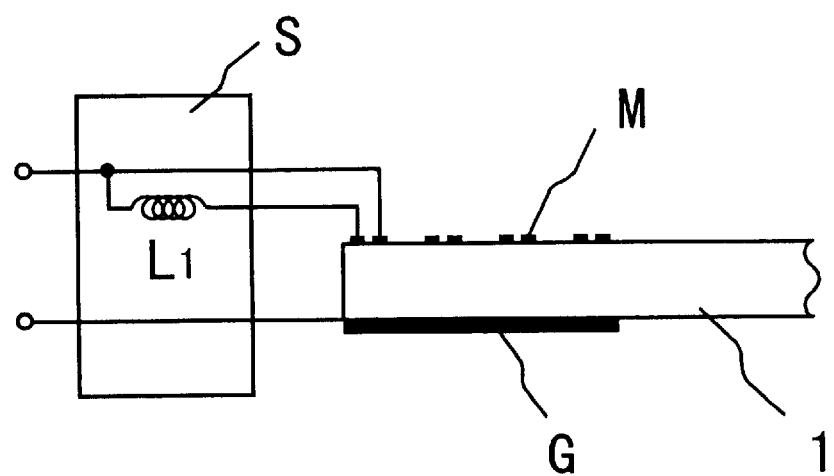
FIG. 9 shows a fragmentary sectional view of the elastic wave position-sensing device in FIG. 7.

FIG. 9 shows a fragmentary sectional view of the elastic wave position-sensing device in FIG. 7. Earth electrode (G), made from aluminium thin film, is formed on the lower end surface of piezoelectric substrate (1) and corresponding with interdigital transducer (M). Input terminals of electrodes ($M_1$ and $M_2$) are connected with phase shifter (S) including coil $L_1$.

Figure 10:
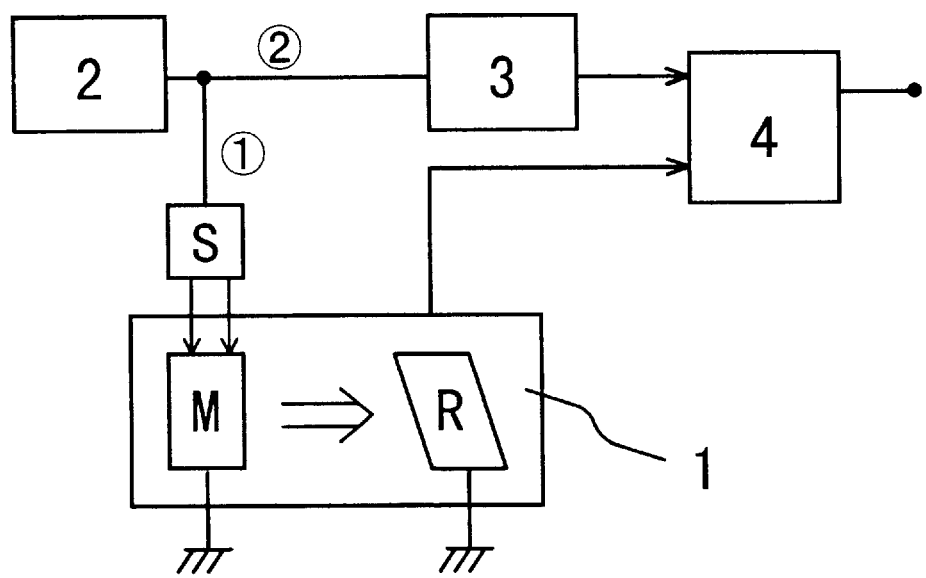
FIG. 10 shows a diagram of a driving circuit of the elastic wave position-sensing device in FIG. 7.

FIG. 10 shows a diagram of a driving circuit of the elastic wave position-sensing device in FIG. 7. The driving circuit includes oscillator (2), attenuator (3) and phase comparator (4). An electric signal ② is transmitted from oscillator (2) to phase comparator (4) via attenuator (3). On the other hand, an electric signal ① from oscillator (2) is divided into two electric signals $V_1$ and $V_2$, with the phase difference 2πy, by phase shifter (S), and then, the electric signals $V_1$ and $V_2$, with a frequency approximately corresponding to the interdigital periodicity P, are applied between electrode ($M_1$) and earth electrode (G), and between electrode ($M_2$) and earth electrode (G), respectively. In this time, an unidirectional elastic wave having the wavelength approximately equal to the interdigital periodicity P is excited in piezoelectric substrate (1), on condition that x<½ in the shorter distance xP of interdigital transducer (M), and x+y= ±½ in the phase difference 2πy. If x=¼, y=¼ or y=−¾. Thus, the unidirectional elastic wave is excited in piezoelectric substrate (1), on condition that xP=100 μm as shown in FIG. 8, and 2πy=π/2(90°) or 2πy=−3π/2(−270°). The excitation of the unidirectional elastic wave generates no reflection of an elastic wave at the side surface of piezoelectric substrate (1), so that seldom or never makes a noise. In addition, the excitation of the unidirectional elastic wave reduces a waste of an electric energy applied to interdigital transducer (M), causing the elastic wave position-sensing device in FIG. 7 to be operated under low power consumption with low voltage.

An arrow on piezoelectric substrate (1) in FIG. 10 shows the transmitting direction of the elastic wave. Interdigital transducers (M and R) form minute propagation lanes $Z_j$ (j=1, 2, . . . , χ) of the elastic wave in piezoelectric substrate (1), the minute propagation lanes $Z_j$ corresponding to the positions $F_j$. The elastic wave is transduced to electric signals $E_j$ (j=1, 2, . . . , χ) with phases $θ_j$ (j=1, 2, . . . , χ) by interdigital transducer (R), the phases $θ_j$ corresponding to the positions $F_j$, respectively. Each electric signal $E_j$ has a frequency approximately corresponding to the interdigital periodicity P. The total phase $Σθ_j$ made by the phases $θ_j$ is zero, and the total electric signal $ΣE_j$ made by the electric signals $E_j$ is also zero. Thus, the total electric signal $ΣE_j$ is not able to be detected at interdigital transducer (R).

If touching a position $F_x$, out of the positions $F_j$ in FIG. 7, on a minute propagation lane $Z_x$ out of the minute propagation lanes $Z_j$, an electric signal E with a phase θ is delivered from interdigital transducer (R). As the position $F_x$ corresponds to an electric signal $E_x$ with a phase $θ_x$, the total electric signal $ΣE_j$ minus the electric signal $E_x$ is equal to the electric signal E, and the total phase $Σθ_j$ minus the phase $θ_x$ is equal to the phase θ. In other words, only the elastic wave in the minute propagation lane $Z_x$ is disappeared and is not transduced to the electric signal $E_x$ when touching the position $F_x$. As a result, the electric signal E being equal to the total electric signal $ΣE_j$ minus the electric signal $E_x$ is delivered from interdigital transducer (R). Thus, the position $F_x$ is detected from the phase $θ_x$ corresponding to the electric signal $E_x$. The electric signal transmitted from oscillator (2) to phase comparator (4) via attenuator (3) has the phase approximately equal to the total phase $Σθ_j$, that is zero. Accordingly, phase comparator (4) detects a difference between the phase of the electric signal transmitted from oscillator (2) to phase comparator (4) and the phase θ of the electric signal E delivered from interdigital transducer (R), the phase difference corresponding to the phase $θ_x$.

Figure 11:
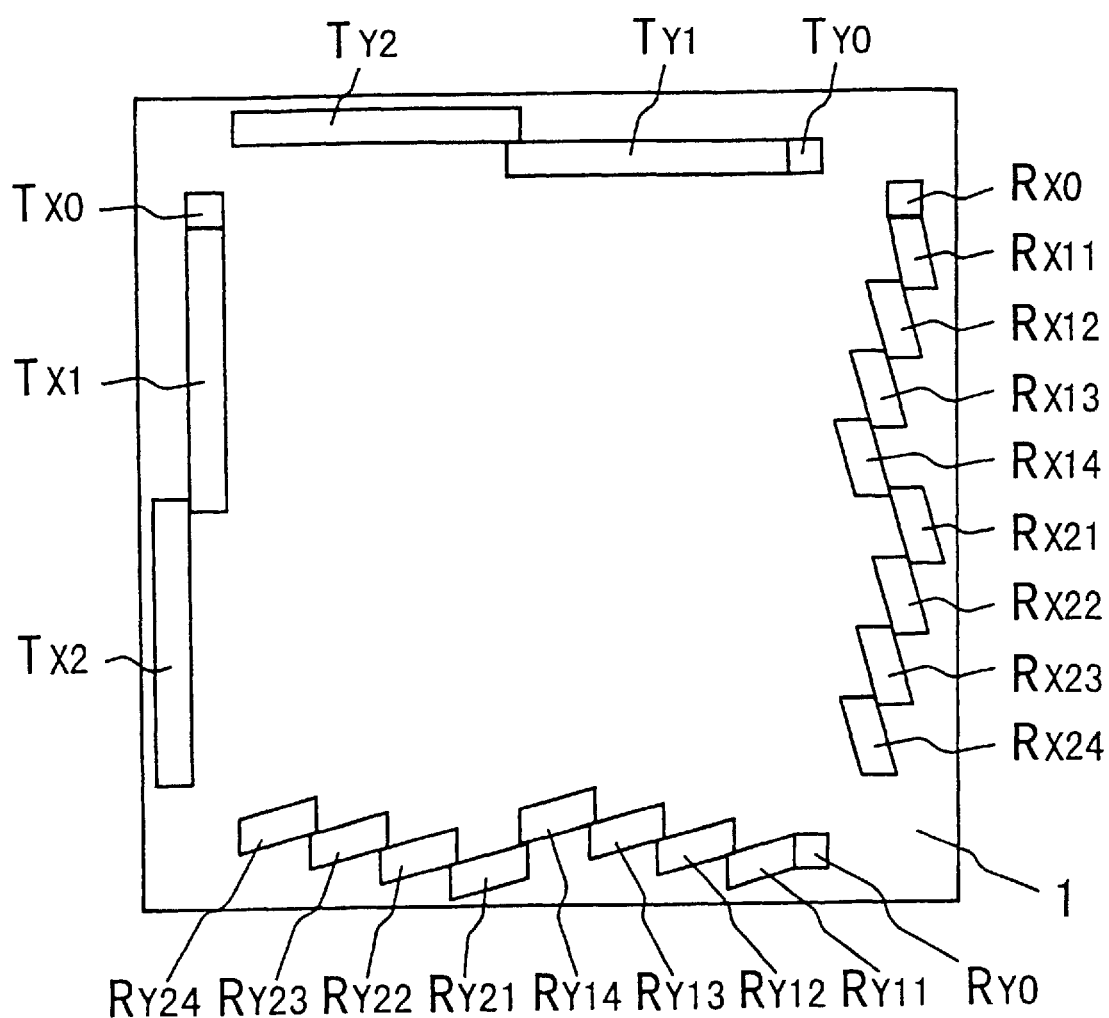
FIG. 11 shows a plan view of an elastic wave position-sensing device according to a third embodiment of the present invention.

FIG. 11 shows a plan view of an elastic wave position-sensing device according to a third embodiment of the present invention. The elastic wave position-sensing device comprises piezoelectric substrate (1), controlling system (5), switches ($W_1$ and $W_2$), amplifier ($A_x$) and elastic wave transducing units (X and Y). Elastic wave transducing unit (X) comprises input interdigital transducers ($T_{X0}$, $T_{X1}$ and $T_{X2}$) and output interdigital transducers ($R_{X0}$, $R_{X11}$, $R_{X12}$, $R_{X13}$, $R_{X14}$, $R_{X21}$, $R_{X22}$, $R_{X23}$ and $R_{X24}$). Elastic wave transducing unit (Y) comprises input interdigital transducers ($T_{Y0}$, $T_{Y1}$ and $T_{Y2}$) and output interdigital transducers ($R_{Y0}$, $R_{Y11}$, $R_{Y12}$, $R_{Y13}$, $R_{Y14}$, $R_{Y21}$, $R_{Y22}$, $R_{Y23}$ and $R_{Y24}$). FIG. 11 shows only piezoelectric substrate (1) and each interdigital transducer made from aluminium thin film and formed on the upper end surface of piezoelectric substrate (1). Interdigital transducers ($T_{X0}$, $R_{X0}$, $T_{Y0}$ and $R_{Y0}$) have the same common-type constructions with an overlap length shorter than that of interdigital transducers ($T_{X1}$, $T_{X2}$, $T_{Y1}$ and $T_{Y2}$) having the same common-type constructions. Interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) have the same constructions. The finger direction of interdigital transducers ($R_{X11}$, $R_{X12}$, $R_{X13}$, $R_{X14}$, $R_{X21}$, $R_{X22}$, $R_{X23}$ and $R_{X24}$) is not parallel to that of interdigital transducers ($T_{X1}$ and $T_{X2}$). The finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is not parallel to that of interdigital transducers ($T_{Y1}$ and $T_{Y2}$).

Figure 12:
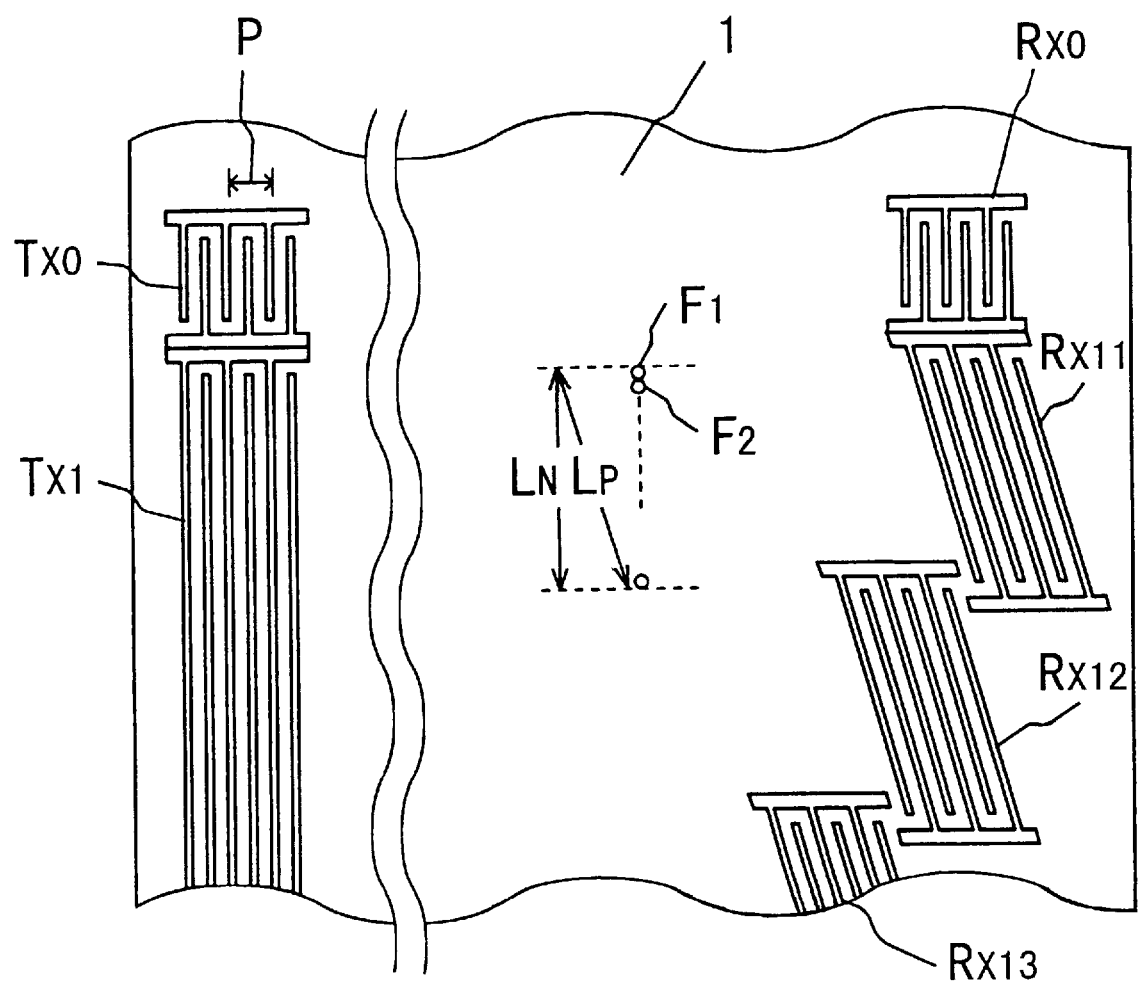
FIG. 12 shows a fragmentary plan view, on an enlarged scale, of the elastic wave position-sensing device in FIG. 11.

FIG. 12 shows a fragmentary plan view, on an enlarged scale, of the elastic wave position-sensing device in FIG. 11. Each interdigital transducer consists of ten finger pairs, respectively. Each of interdigital transducers ($T_{X0}$, $R_{X0}$, $T_{Y0}$ and $R_{Y0}$) has an interdigital periodicity P of 400 μm and an overlap length of 1 mm. Each of interdigital transducers ($T_{X1}$, $T_{X2}$, $T_{Y1}$ and $T_{Y2}$) has an interdigital periodicity P of 400 μm and an overlap length L of 12 mm. The sum of each overlap length $L_N$, along the finger direction of interdigital transducer ($T_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($T_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($T_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($T_{Y2}$), of interdigital transducers ($R_{Y21}$, $R_{Y22}$, $R_{Y23}$ and $R_{Y24}$) is equal to the overlap length L. In the elastic wave position-sensing device, it is possible to sense a touch with a finger or others on one of positions $F_j$ (j=1, 2, ... , χ), on the upper- or lower end surface of piezoelectric substrate (1), with respect to both elastic wave transducing units (X and Y). FIG. 12 shows the positions $F_j$, on only the upper end surface of piezoelectric substrate (1), with respect to only elastic wave transducing unit (X).

Each of interdigital transducers ($R_{X11}$, $R_{X12}$, $R_{X13}$, $R_{X14}$, $R_{X21}$, $R_{X22}$, $R_{X23}$ and $R_{X24}$) is, as interdigital transducer (R) shown in FIG. 2, located such that the finger direction thereof is slanting to that of interdigital transducer ($T_{X1}$, or $T_{X2}$) by an angle α. In the same way, each of interdigital transducers ($R_{Y11}$, $R_{Y12}$, $R_{Y13}$ $R_{Y14}$, $R_{Y21}$, $R_{Y22}$, $R_{Y23}$ and $R_{Y24}$) is located such that the finger direction thereof is slanting to that of interdigital transducer ($T_{Y1}$ or $T_{Y2}$) by an angle α. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is, as interdigital transducer (R) shown in FIG. 2, equal to the product of the interdigital periodicity P and cos α. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos α. Each overlap length $L_P$, along the finger direction of interdigital transducers ($R_{X11}$, $R_{X12}$, $R_{X13}$ and $R_{X14}$), of interdigital transducers ($R_{X11}$, $R_{X12}$, $R_{X13}$ and $R_{X14}$) is equal to the product of the overlap length $L_N$ and sec α. In other words, the sum of each overlap length $L_P$ of interdigital transducers ($R_{X11}$, $R_{X12}$, $R_{X13}$ and $R_{X14}$) is equal to the product of the overlap length L and sec α. In the same way, the sum of each overlap length $L_P$ of interdigital transducers ($R_{X21}$, $R_{X22}$, $R_{X23}$ and $R_{X24}$) is equal to the product of the overlap length L and sec α. The sum of each overlap length $L_P$ of interdigital transducers ($R_{Y11}$, $R_{Y12}$, $R_{Y13}$ and $R_{Y14}$) is equal to the product of the overlap length L and sec α. The sum of each overlap length $L_P$ of interdigital transducers ($R_{Y21}$, $R_{Y22}$, $R_{Y23}$ and $R_{Y24}$) is equal to the product of the overlap length L and sec α.

Figure 13:
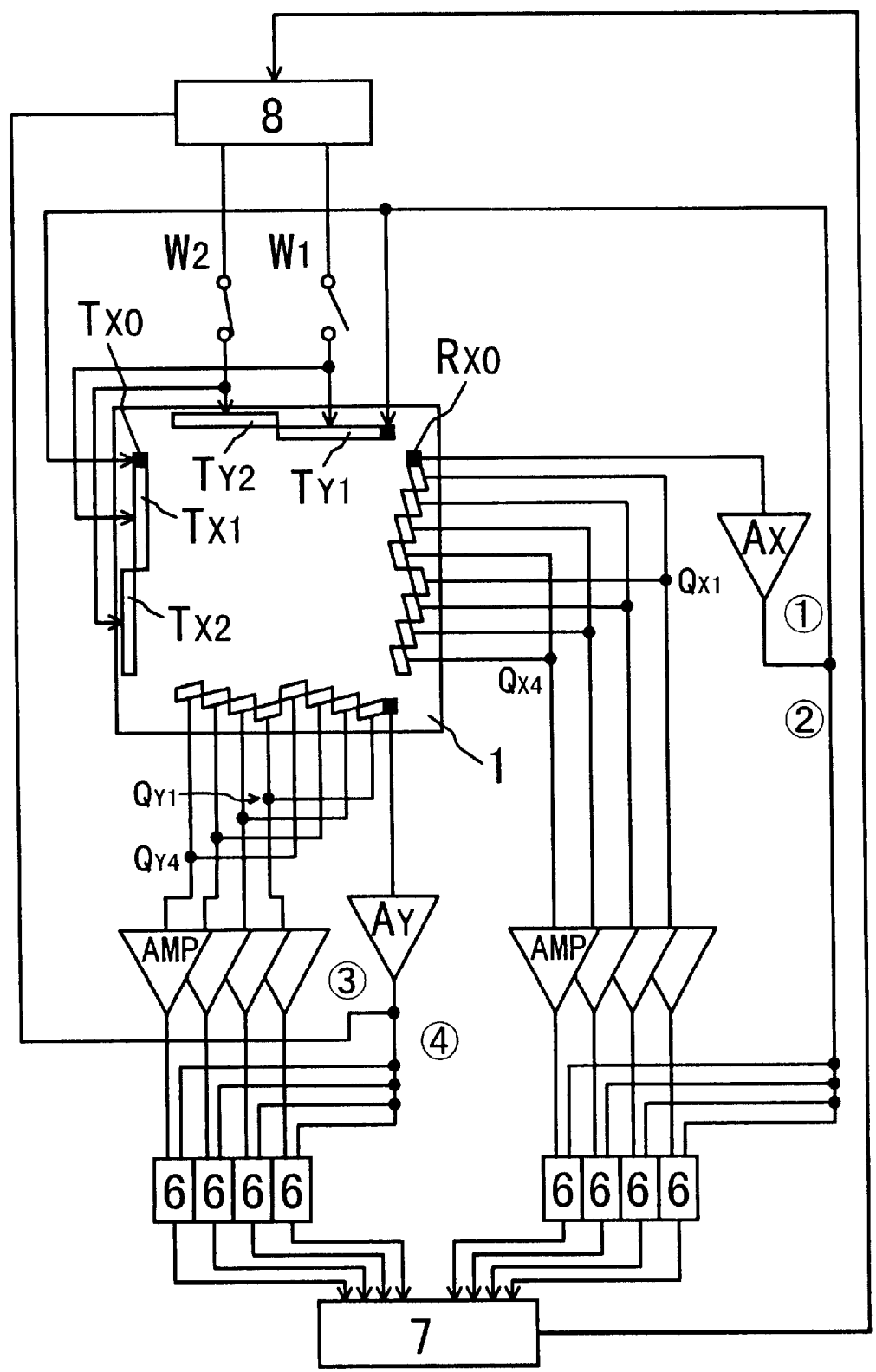
FIG. 13 shows a diagram of a driving circuit of the elastic wave position-sensing device in FIG. 11.

FIG. 13 shows a diagram of a driving circuit of the elastic wave position-sensing device in FIG. 11. Controlling system (5) comprises eight phase comparators (6), computer (7) and switch-change unit (8). Output terminal of switch ($W_1$) is connected with input terminals of interdigital transducers ($T_{X1}$ and $T_{Y1}$). Output terminal of switch ($W_2$) is connected with input terminals of interdigital transducers ($T_{X2}$ and $T_{Y2}$). A point $Q_{X1}$ joining output terminals of interdigital transducers ($R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X23}$ ), and a point $Q_{X4}$ joining output terminals of interdigital transducers ($R_{X14}$ and $R_{X24}$) are connected with phase comparators (6) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (6) via amplifiers (AMP), respectively.

In the driving circuit in FIG. 13, when an electric signal having a frequency approximately corresponding to the interdigital periodicity P is applied to interdigital transducers ($T_{X0}$, $T_{X1}$, and $T_{X2}$), respectively, the elastic wave having the wavelength approximately equal to the interdigital periodicity P is excited in piezoelectric substrate (1) effectively.

The elastic wave excited by interdigital transducer ($T_{X0}$) is transduced to an electric signal with a phase $\theta_{base}$ by interdigital transducer ($R_{X0}$), the electric signal being delivered from interdigital transducer ($R_{X0}$) and amplified by amplifier ($A_X$). An electric signal ① is applied to interdigital transducers ($T_{X0}$ and $T_{Y0}$). Thus, interdigital transducers ($T_{X0}$ and $R_{X0}$), a propagation lane, as a delay element, of an elastic wave between interdigital transducers ($T_{X0}$ and $R_{X0}$), and amplifier ($A_X$) form an oscillator, causing not only a low voltage operation and low power consumption, but also a small-sized circuit with a simple structure. An electric signal ② is applied to four phase comparators (6). The elastic wave excited by interdigital transducer ($T_{X1}$) is transduced to electric signals $E_j$ (j=1, 2, ..., $\chi$) with phases $\theta_j$ (j=1, 2, ..., $\chi$) by each of interdigital transducers ($R_{X11}$, $R_{X12}$, $R_{X13}$ and $R_{X14}$), the phases $\theta_j$ corresponding to the positions $F_j$, respectively. The elastic wave excited by interdigital transducer ($T_{X2}$) is transduced to electric signals $E_j$ (j=1, 2, ..., $\chi$) with phases $\theta_j$ (j=1, 2, ..., $\chi$) by each of interdigital transducers ($R_{X21}$, $R_{X22}$, $R_{X23}$ and $R_{X24}$), the phases $\theta_j$ corresponding to the positions $F_j$, respectively. Each electric signal $E_j$ has a frequency approximately corresponding to the interdigital periodicity P. The total phase $\Sigma\theta_j$ made by the phases $\theta_j$ is zero. The total electric signal $\Sigma E_j$ made by the electric signals $E_j$ is also zero and is not able to be detected at each of interdigital transducers ($R_{X11}$, $R_{X12}$, $R_{X13}$, $R_{X14}$, $R_{X21}$, $R_{X22}$, $R_{X23}$ and $R_{X24}$).

In the driving circuit in FIG. 13, when an electric signal having a frequency approximately corresponding to the interdigital periodicity P is applied to interdigital transducers ($T_{Y0}$, $T_{Y1}$ and $T_{Y2}$), respectively, the elastic wave having the wavelength approximately equal to the interdigital periodicity P is excited in piezoelectric substrate (1) effectively. The elastic wave excited by interdigital transducer ($T_{Y0}$) is transduced to an electric signal with a phase $\theta_{base}$ by interdigital transducer ($R_{Y0}$), the electric signal being delivered from interdigital transducer ($R_{Y0}$) and amplified by amplifier ($A_Y$). An electric signal ③ is applied to switch-change unit (8), and an electric signal ④ is applied to four phase comparators (6). Switch-change unit (8) under a control of computer (7) turns on and off switches ($W_1$ and $W_2$) alternately, and supplies a group of interdigital transducers ($T_{X1}$ and $T_{Y1}$) and a group of interdigital transducers ($T_{X2}$ and $T_{Y2}$) with the electric signal ③ alternately. The elastic wave excited by interdigital transducer ($T_{Y1}$) is transduced to electric signals $E_j$ (j=1, 2, ..., $\chi$) with phases $\theta_j$ (j=1, 2, ..., $\chi$) by each of interdigital transducers ($R_{Y11}$, $R_{Y12}$, $R_{Y13}$ and $R_{Y14}$), the phases $\theta_j$ corresponding to the positions $F_j$, respectively. The elastic wave excited by interdigital transducer ($T_{Y2}$) is transduced to electric signals $E_j$ (j=1, 2, ..., $\chi$) with phases $\theta_j$ (j=1, 2, ..., $\chi$) by each of interdigital transducers ($R_{Y21}$, $R_{Y22}$, $R_{Y23}$ and $R_{Y24}$), the phases $\theta_j$ corresponding to the positions $F_j$, respectively. Each electric signal $E_j$ has a frequency approximately corresponding to the interdigital periodicity P. The total phase $\Sigma\theta_j$ made by the phases $\theta_j$ is zero. The total electric signal $\Sigma E_j$ made by the electric signals $E_j$ is also zero and is not able to be detected at each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($T_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the elastic wave in piezoelectric substrate (1), respectively, each propagation lane consisting of minute propagation lanes $Z_j$ (j=1, 2, ..., $\chi$) corresponding to the positions $F_j$. Interdigital transducer ($T_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the elastic wave in piezoelectric substrate (1), respectively, each propagation lane consisting of minute propagation lanes $Z_j$ (j=1, 2, ..., $\chi$) corresponding to the positions $F_j$. In the same way, interdigital transducer ($T_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the elastic wave in piezoelectric substrate (1), respectively, each propagation lane consisting of minute propagation lanes $Z_j$ (j=1, 2, ..., $\chi$) corresponding to the positions $F_j$. Interdigital transducer ($T_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the elastic wave in piezoelectric substrate (1), respectively, each propagation lane consisting of minute propagation lanes $Z_j$ (j=1, 2, ..., $\chi$) corresponding to the positions $F_j$.

When touching a position $F_x$, out of the positions $F_j$ in FIG. 12, on a minute propagation lane $Z_x$ out of the minute propagation lanes $Z_j$ of one of the propagation lanes ($D_{X11}$, $D_{X12}$, $D_{X13}$, $D_{X14}$, $D_{X21}$, $D_{X22}$, $D_{X23}$ and $D_{X24}$), an electric signal E with a phase $\theta$ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the elastic wave on the minute propagation lane $Z_x$ is disappeared and is not transduced to an electric signal $E_x$ with a phase $\theta_x$. As a result, the electric signal E being equal to the total electric signal $\Sigma E_j$ minus the electric signal $E_x$ is delivered from one of interdigital transducers ($R_{X11}$, $R_{X12}$, $R_{X13}$, $R_{X14}$, $R_{X21}$, $R_{X22}$, $R_{X23}$ and $R_{X24}$), the phase $\theta$ being equal to the total phase $\Sigma\theta_j$ minus the phase $\theta_x$, that is ($\theta=\Sigma\theta_j-\theta_x=-\theta_x$). Phase comparator (6) detects a difference between the phase $\theta$ and the phase $\theta_{base}$, only when the phase comparator (6) is applied with the electric signal E. Computer (7) finds the position $F_x$ from the phase difference ($\theta_{base}-\theta$). In the same way, when touching a position $F_x$ on a minute propagation lane $Z_x$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase $\theta$ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the elastic wave on the minute propagation lane $Z_x$ is disappeared and is not transduced to an electric signal $E_x$ with a phase $\theta_x$, the electric signal E being equal to the total electric signal $\Sigma E_j$ minus the electric signal $E_x$, the phase $\theta$ being equal to the total phase $\Sigma\theta_j$ minus the phase $\theta_x$. Phase comparator (6) detects a difference between the phase $\theta$ and the phase $\theta_{base}$, only when the phase comparator (6) is applied with the electric signal E. Computer (7) finds the position $F_x$ from the phase difference ($\theta_{base}-\theta$).

As mentioned previously, switch-change unit (8) under a control of computer (7) in FIG. 13 turns on and off switches ($W_1$ and $W_2$) alternately. At the same time, computer (7) detects switch ($W_1$ or $W_2$) closed when the electric signal E appears at one of the points $Q_{X1}$, $Q_{X2}$, $Q_{X3}$, and $Q_{X4}$. In the same way, computer (7) detects switch ($W_1$ or $W_2$) closed when the electric signal E appears at the point $Q_{Y1}$, $Q_{Y2}$, $Q_{Y3}$ and $Q_{Y4}$. Thus, for example, if switch ($W_2$) is closed when the electric signal E appears at the point $Q_{X3}$, it is clear that the electric signal E is delivered from interdigital transducer ($R_{X23}$). On the other hand, if switch ($W_1$) is closed when the electric signal E appears at the point $Q_{Y1}$, it is clear that the electric signal E is delivered from interdigital transducer ($R_{Y11}$). Therefore, it is clear that the touch-position $F_x$ is on the minute propagation lane $Z_x$ out of the propagation lane ($D_{X23}$ and on the minute propagation lane $Z_x$ out of the propagation lane ($D_{Y11}$). Since eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other, it is clear that the touch-position $F_x$ exists on a crossing point made by the minute propagation lane $Z_x$ out of the propagation lane ($D_{X23}$) and the minute propagation lane $Z_x$ out of the propagation lane ($D_{Y11}$). In addition, eight propagation lanes ($D_{X11}$, $D_{X12}$, $D_{X13}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other. Accordingly, there is no null touch-point on the upper- or lower end surface of piezoelectric substrate (1). In order to make no null touch-point, it is also effective to arrange eight propagation lanes ($D_{X11}$, $D_{X12}$, $D_{X13}$, $D_{Y14}$, $D_{X21}$, $D_{X22}$, $D_{X23}$ and $D_{X24}$) as they are partially overlapping each other, and arrange eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) as they are partially overlapping each other.

Figure 14:
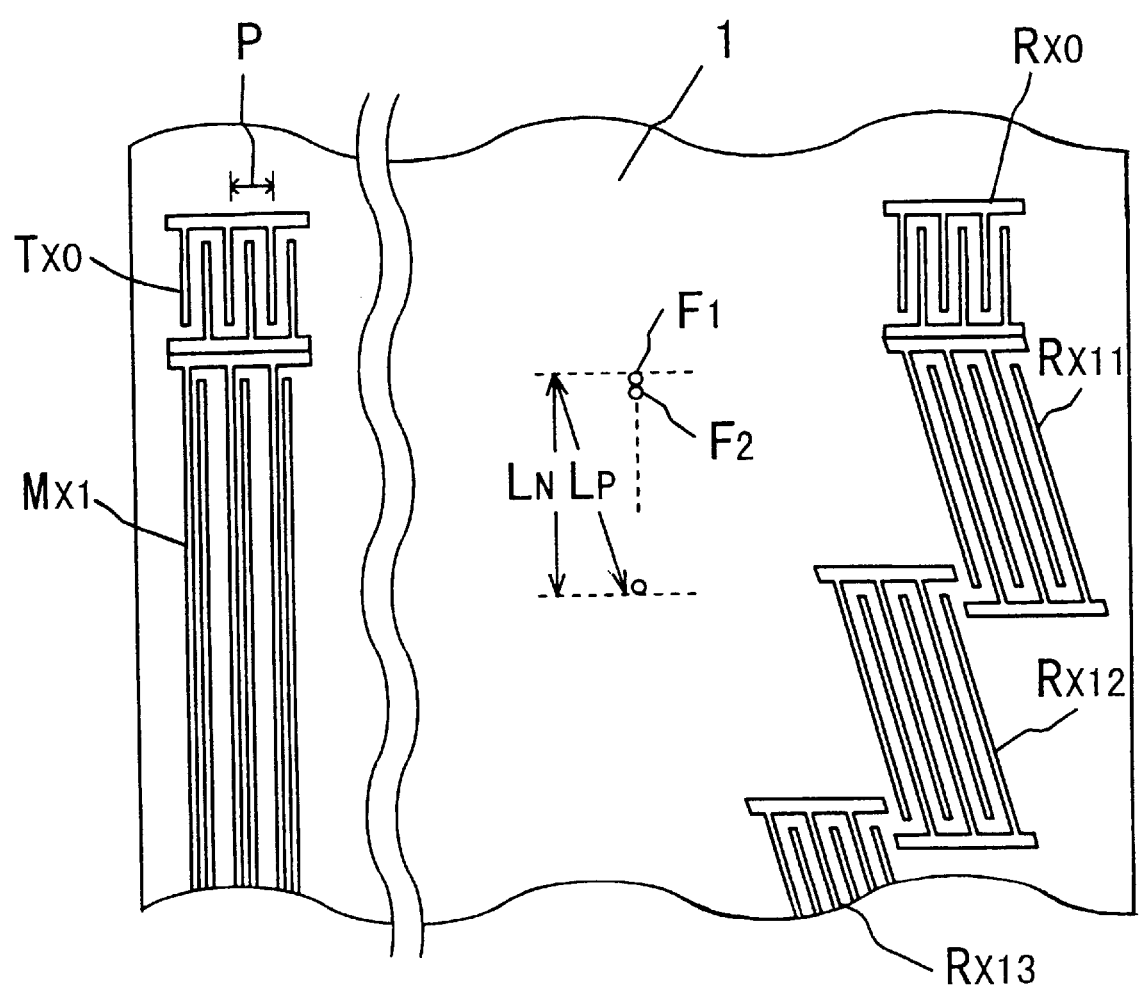
FIG. 14 shows a fragmentary plan view, on an enlarged scale, of an elastic wave position-sensing device according to a fourth embodiment of the present invention.

FIG. 14 shows a fragmentary plan view, on an enlarged scale, of an elastic wave position-sensing device according to a fourth embodiment of the present invention. The elastic wave position-sensing device comprises piezoelectric substrate (1), controlling system (5), a pair of switches ($W_{11}$ and $W_{12}$), a pair of switches ($W_{21}$ and $W_{22}$), amplifier ($A_x$), earth electrodes ($G_{X1}$, $G_{X2}$, $G_{Y1}$, and $G_{Y2}$), phase shifter (S) and elastic wave transducing units (X and Y). Elastic wave transducing unit (X) in FIG. 14 has the same construction as that in FIG. 11, except for using of interdigital transducers ($M_{X1}$ and $M_{X2}$) in place of interdigital transducers ($T_{X1}$ and $T_{X2}$). Elastic wave transducing unit (Y) in FIG. 14 has the same construction as that in FIG. 11, except for using of interdigital transducers ($M_{Y1}$ and $M_{Y2}$) in place of interdigital transducers ($T_{Y1}$ and $T_{Y2}$). Each of interdigital transducers ($M_{X1}$, $M_{X2}$, $M_{Y1}$ and $M_{Y2}$) consists of ten finger pairs, and has an interdigital periodicity P of 400 $\mu$m and an overlap length L of 12 mm. The sum of each overlap length $L_N$, along the finger direction of interdigital transducer ($M_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($M_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($M_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($M_{Y2}$), of interdigital transducers ($R_{Y21}$, $R_{Y22}$, $R_{Y23}$ and $R_{Y24}$) is equal to the overlap length L.

In the elastic wave position-sensing device in FIG. 14, it is possible to sense a touch with a finger or others on one of positions $F_j$ (j=1, 2, ..., $\chi$), on the upper- or lower end surface of piezoelectric substrate (1), with respect to both elastic wave transducing units (X and Y). FIG. 14 shows the positions $F_j$, on only the upper end surface of piezoelectric substrate (1), with respect to only elastic wave transducing unit (X).

Each of interdigital transducers ($R_{X11}$, $R_{X12}$, $R_{X13}$, $R_{X14}$, $R_{X21}$, $R_{X22}$, $R_{X23}$ and $R_{X24}$) is, as interdigital transducer (R) shown in FIG. 2, located such that the finger direction thereof is slanting to that of interdigital transducer ($M_{X1}$ or $M_{X2}$) by an angle $\alpha$. In the same way, each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is located such that the finger direction thereof is slanting to that of interdigital transducer ($M_{Y1}$ and $M_{Y2}$) by an angle $\alpha$. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is, as interdigital transducer (R) shown in FIG. 2, equal to the product of the interdigital periodicity P and cos $\alpha$. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos $\alpha$. The sum of each overlap length $L_P$ of interdigital transducers ($R_{X11}$, $R_{X12}$, $R_{X13}$ and $R_{X14}$) is equal to the product of the overlap length L and sec $\alpha$. In the same way, the sum of each overlap length $L_P$ of interdigital transducers ($R_{X21}$, $R_{X22}$, $R_{X23}$ and $R_{X24}$) is equal to the product of the overlap length L and sec $\alpha$. The sum of each overlap length $L_P$ of interdigital transducers ($R_{Y11}$, $R_{Y12}$, $R_{Y13}$ and $R_{Y14}$) is equal to the product of the overlap length L and sec $\alpha$. The sum of each overlap length $L_P$ of interdigital transducers ($R_{Y21}$, $R_{Y22}$, $R_{Y23}$ and $R_{Y24}$) is equal to the product of the overlap length L and sec $\alpha$.

Interdigital transducer ($M_{X1}$), as interdigital transducer (M) shown in FIG. 8, consists of two electrodes ($M_{X1-1}$ and $M_{X1-2}$), and has two kinds of distances between one electrode finger of electrode ($M_{X11}$) and two neighboring electrode fingers of electrode ($M_{X1-2}$), a shorter distance xP of the two kinds of distances being 100 $\mu$m. Interdigital transducers ($M_{X1}$, $M_{X2}$, $M_{Y1}$ and $M_{Y2}$), made from aluminium thin film, have the same constructions each other.

Earth electrodes ($G_{X1}$, $G_{X2}$, $G_{Y1}$ and $G_{Y2}$), made from aluminium thin film, are formed on the lower end surface of piezoelectric substrate (1), as earth electrode (G) shown in FIG. 9, and are corresponding with interdigital transducers ($M_{X1}$, $M_{X2}$, $M_{Y1}$ and $M_{Y2}$), respectively. Input terminals of electrodes ($M_{X1-1}$ and $M_{X1-2}$) are, as interdigital transducer (M) shown in FIG. 9, connected with phase shifter (S) including coil $L_1$. Earth electrodes ($G_{X1}$, $G_{X2}$, $G_{Y1}$ and $G_{Y2}$) have the same constructions each other.

Figure 15:
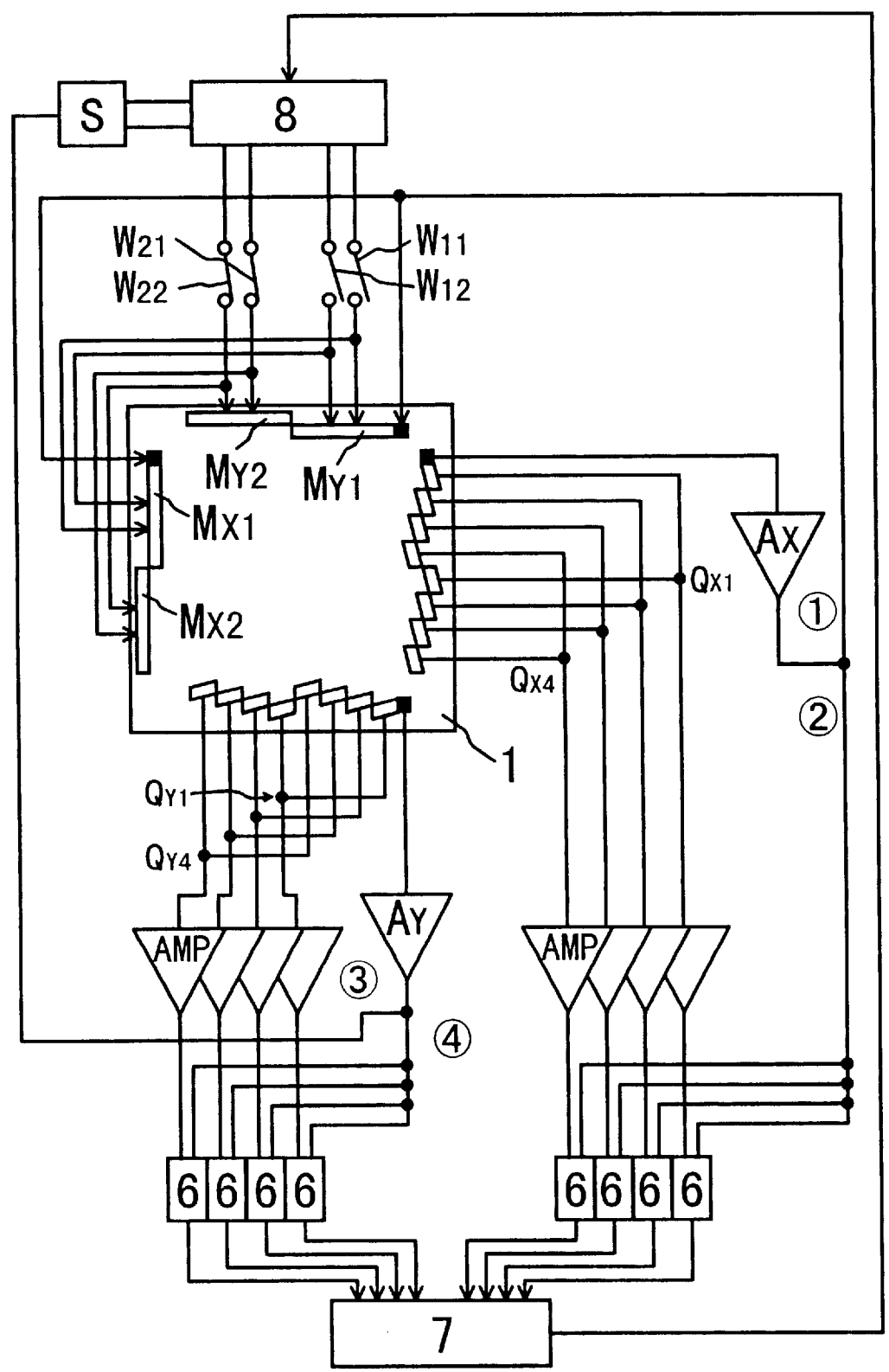
FIG. 15 shows a diagram of a driving circuit of the elastic wave position-sensing device in FIG. 14.

FIG. 15 shows a diagram of a driving circuit of the elastic wave position-sensing device in FIG. 14. Controlling system (5) comprises eight phase comparators (6), computer (7) and switch-change unit (8). Output terminal of switch ($W_{11}$) is connected with input terminals of interdigital transducers ($M_{X1-1}$ and $M_{Y1-1}$). Output terminal of switch ($W_{12}$) is connected with input terminals of interdigital transducers ($M_{X1-2}$ and $M_{Y1-2}$). Output terminal of switch ($W_{21}$) is connected with input terminals of interdigital transducers ($M_{X2-1}$ and $M_{Y2-1}$). Output terminal of switch ($W_{22}$) is connected with input terminals of interdigital transducers ($M_{X2-2}$ and $M_{Y2-2}$). A point $Q_{X1}$ joining output terminals of interdigital transducers ($R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X23}$), and a point $Q_{X4}$ joining output terminals of interdigital transducers ($R_{X14}$ and $R_{X24}$) are connected with phase comparators (6) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (6) via amplifiers (AMP), respectively.

Interdigital transducers ($T_{X0}$, $R_{X0}$, $T_{Y0}$ and $R_{Y0}$) in FIG. 15 have the same function as that in FIG. 13. In addition, interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) in FIG. 15 have the same function as that in FIG. 13.

In the driving circuit in FIG. 15, electric signals $V_1$ and $V_2$, with a frequency approximately corresponding to the interdigital periodicity P and having the phase difference $2\pi y$ (90° or −270°), are applied between electrode ($M_{X1-1}$)

and earth electrode ($G_{X1}$), and between electrode ($M_{X1-2}$) and earth electrode ($G_{X1}$), respectively. In this time, an unidirectional elastic wave having the wavelength approximately equal to the interdigital periodicity P is excited in piezoelectric substrate (1), because the shorter distance xP of interdigital transducer ($M_{X1}$) is 100 μm and the phase difference 2πy is 90° or −270°. Thus, the unidirectional elastic wave is excited in piezoelectric substrate (1) by interdigital transducer ($M_{X1}$) and earth electrode ($G_{X1}$). In the same way, an unidirectional elastic wave is excited in piezoelectric substrate (1) by interdigital transducer ($M_{X2}$) and earth electrode ($G_{X2}$). An unidirectional elastic wave is excited in piezoelectric substrate (1) by interdigital transducer ($M_{Y1}$) and earth electrode ($G_{Y1}$). An unidirectional elastic wave is excited in piezoelectric substrate (1) by interdigital transducer ($M_{Y2}$) and earth electrode ($G_{Y2}$). An electric signal ③ is applied to switch-change unit (8) via phase shifter (S). Switch-change unit (8) under a control of computer (7) turns on and off the pair of switches ($W_{11}$ and $W_{12}$) and the pair of switches ($W_{21}$ and $W_{22}$) alternately, and supplies a group of interdigital transducers ($M_{X1}$ and $M_{Y1}$) and a group of interdigital transducers ($M_{X2}$ and $M_{Y2}$) with the electric signal ③ alternately. In this time, switches ($W_{11}$ and $W_{12}$) are in the same condition each other, and switches ($W_{21}$ and $W_{22}$) are in the same condition each other.

The elastic wave excited by interdigital transducer ($M_{X1}$) is transduced to electric signals $E_j$ (j=1, 2, ..., χ) with phases $θ_j$ (j=1, 2, ..., χ) by each of interdigital transducers ($R_{X11}$, $R_{X12}$, $R_{X13}$, and $R_{X14}$). The elastic wave excited by interdigital transducer ($M_{X2}$) is transduced to electric signals $E_j$ (j=1, 2, ..., χ) with phases $θ_j$ (j=1, 2, ..., χ) by each of interdigital transducers ($R_{X21}$, $R_{X22}$, $R_{X23}$ and $R_{24}$). The elastic wave excited by interdigital transducer ($M_{Y1}$) is transduced to electric signals $E_j$ (j=1, 2, ..., χ) with phases $θ_j$ (j=1, 2, ..., χ) by each of interdigital transducers ($R_{Y11}$, $R_{Y12}$, $R_{Y13}$ and $R_{Y14}$). The elastic wave excited by interdigital transducer ($M_{Y2}$) is transduced to electric signals $E_j$ (j=1, 2, ..., χ) with phases $θ_j$ (j=1, 2, ..., χ) by each of interdigital transducers ($R_{Y21}$, $R_{Y22}$, $R_{Y23}$ and $R_{24}$). The phases $θ_j$ correspond to the positions $F_j$, respectively. Each electric signal $E_j$ has a frequency approximately corresponding to the interdigital periodicity P. The total phase $Σθ_j$ made by the phases $θ_j$ is zero. The total electric signal $ΣE_j$ made by the electric signals $E_j$ is also zero and is not able to be detected at each of interdigital transducers ($R_{Y11}$, $R_{Y12}$, $R_{X13}$, $R_{X14}$, $R_{X21}$, $R_{X22}$, $R_{X23}$, $R_{24}$, $R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($M_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the elastic wave in piezoelectric substrate (1), respectively. Interdigital transducer ($M_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the elastic wave in piezoelectric substrate (1), respectively. In the same way, interdigital transducer ($M_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the elastic wave in piezoelectric substrate (1), respectively. Interdigital transducer ($M_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the elastic wave in piezoelectric substrate (1), respectively. Each of propagation lanes ($D_{X11}$, $D_{X12}$, $D_{13}$, $D_{X14}$, $D_{X21}$, $D_{X22}$, $D_{X23}$, $D_{X24}$, $D_{Y11}$, $D_{Y12}$, $D_{Y13}$, $D_{Y14}$, $D_{Y21}$, $D_{Y22}$, $D_{Y23}$ and $D_{Y24}$) consists of minute propagation lanes $Z_j$ (j=1, 2, ..., χ) corresponding to the positions $F_j$. Eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other. In addition, eight propagation lanes ($D_{X11}$, $D_{X12}$, $D_{X13}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other.

When touching a position $F_x$, out of the positions $F_j$ in FIG. 14, on a minute propagation lane $Z_x$ out of the minute propagation lanes $Z_j$ of one of the propagation lanes ($D_{X11}$, $D_{X12}$, $D_{X13}$, $D_{X14}$, $D_{X21}$, $D_{22}$, $D_{X23}$ and $D_{X24}$), an electric signal E with a phase θ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the elastic wave on the minute propagation lane $Z_x$ is disappeared and is not transduced to an electric signal $E_x$ with a phase $θ_x$, the electric signal E being equal to the total electric signal $ΣE_j$ minus the electric signal $E_x$, the phase θ being equal to the total phase $Σθ_j$ minus the phase $θ_x$. Phase comparator (6) detects a difference between the phase θ and the phase $θ_{base}$, only when the phase comparator (6) is applied with the electric signal E. Computer (7) finds the position $F_x$ from the phase difference ($θ_{base}-θ$). In the same way, when touching a position $F_x$ on a minute propagation lane $Z_x$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase θ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{24}$). In this time, only the elastic wave on the minute propagation lane $Z_x$ is disappeared and is not transduced to an electric signal $E_x$ with a phase $θ_x$, the electric signal E being equal to the total electric signal $ΣE_j$ minus the electric signal $E_x$, the phase θ being equal to the total phase $Σθ_j$ minus the phase $θ_x$. Phase comparator (6) detects a difference between the phase θ and the phase $θ_{base}$, only when the phase comparator (6) is applied with the electric signal E. Computer (7) finds the position $F_x$ from the phase difference ($θ_{base}-θ$).

As mentioned previously, switch-change unit (8) under a control of computer (7) in FIG. 15 turns on and off the pair of switches ($W_{11}$ and $W_{12}$) and the pair of switches ($W_{21}$ and $W_{22}$) alternately. At the same time, computer (7) detects the pair of switches ($W_{11}$ and $W_{12}$) or the pair of switches ($W_{21}$ and $W_{22}$) closed when the electric signal E appears at one of the points $Q_{X1}$, $Q_{X2}$, $Q_{X3}$ and $Q_{X4}$. In the same way, computer (7) detects the pair of switches ($W_{11}$ and $W_{12}$) or the pair of switches ($W_{21}$ and $W_{22}$) closed when the electric signal E appears at the point $Q_{Y1}$, $Q_{Y2}$, $Q_{Y3}$ and $Q_{Y4}$. Thus, for example, if the pair of switches ($W_{21}$ and $W_{22}$) is closed when the electric signal E appears at the point $Q_{X3}$, it is clear that the electric signal E is delivered from interdigital transducer ($R_{X23}$). On the other hand, if the pair of switches ($W_{11}$ and $W_{12}$) is closed when the electric signal E appears at the point $Q_{Y1}$, it is clear that the electric signal E is delivered from interdigital transducer ($R_{Y11}$). Accordingly, it is clear that the touch-position $F_x$ exists on a crossing point made by the minute propagation lane $Z_x$ out of the propagation lane ($D_{X23}$) and the minute propagation lane $Z_x$ out of the propagation lane ($D_{X11}$).

Compared with the elastic wave position-sensing device in FIG. 11, the elastic wave position-sensing device in FIG. 14 can be operated under still lower power consumption owing to the excitation of the unidirectional elastic wave. In addition, no reflection of an elastic wave generates at the side surface of piezoelectric substrate (1) in FIG. 14 because of the excitation of the unidirectional elastic wave. Therefore, the elastic wave position-sensing device in FIG. 14 has little or no noise, so that has a still higher sensitivity.

Because the elastic wave travels the inside of piezoelectric substrate (1), both the upper- and lower end surfaces thereof can be used for touching with a finger or others. In addition, the elastic wave is not intercepted by touching with a finger or others under only a little pressure on the upper- or lower end surface thereof. Therefore, the elastic wave position-sensing device is not affected by, for example, only a light touch with a finger or others on the upper- or lower end surface of piezoelectric substrate (1), food and drink such as coffee or mayonnaise dropped on the upper- or lower end surface of piezoelectric substrate (1), and so on.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An elastic wave position-sensing device comprising:
   a piezoelectric substrate having an upper- and a lower end surfaces running perpendicular to the direction of the thickness d thereof;
   an input interdigital transducer T formed on said upper end surface of said piezoelectric substrate, said thickness d being smaller than an interdigital periodicity P of said interdigital transducer T; and
   an output interdigital transducer R formed on said upper end surface of said piezoelectric substrate such that the finger direction of said interdigital transducer R is slanting to that of said interdigital transducer T by an angle $\alpha$, an interdigital periodicity $P_N$ along the vertical direction to the finger direction of said interdigital transducer R being equal to the product of said interdigital periodicity P and cos $\alpha$,
   said interdigital transducer T receiving an electric signal with a frequency approximately corresponding to said interdigital periodicity P, and exciting an elastic wave in said piezoelectric substrate, said elastic wave having the wavelength approximately equal to said interdigital periodicity P,
   said interdigital transducer R transducing said elastic wave to electric signals $E_j$ (j=1, 2, . . . , $\chi$) with phases $\theta_j$ (j=1, 2, . . . , $\chi$), respectively, said phases $\theta_j$ corresponding to positions $F_j$ (j=1, 2, . . . , X) on said upper- or lower end surface of said piezoelectric substrate, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at said interdigital transducer R,
   said interdigital transducers T and R forming minute propagation lanes $Z_j$ (j=1, 2, . . . , X) of the elastic wave in said piezoelectric substrate, said minute propagation lanes $Z_j$ corresponding to said positions $F_j$,
   said interdigital transducer R delivering an electric signal E with a phase $\theta$ only when touching with a finger or others on a position $F_x$, out of said positions $F_j$, on a minute propagation lane $Z_x$ out of said minute propagation lanes $R_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta E_j$ minus said phase $\theta_x$ being equal to said phase $\theta$.

2. An elastic wave position-sensing device as defined in claim 1, wherein an overlap length $L_P$ along the finger direction of said interdigital transducer R is equal to the product of an overlap length L of said interdigital transducer T and sec $\alpha$.

3. An elastic wave position-sensing device comprising:
   a piezoelectric substrate having an upper- and a lower end surfaces running perpendicular to the direction of the thickness d thereof;
   an input interdigital transducer M formed on said upper end surface of said piezoelectric substrate, said interdigital transducer M consisting of two electrodes $M_1$ and $M_2$ and having two kinds of distances between one electrode finger of said electrode $M_1$ and two neighboring electrode fingers of said electrode $M_2$, said thickness d being smaller than an interdigital periodicity P of said interdigital transducer M;
   an earth electrode G formed on said lower end surface of said piezoelectric substrate and corresponding with said interdigital transducer M;
   an output interdigital transducer R formed on said upper end surface of said piezoelectric substrate such that the finger direction of said interdigital transducer R is slanting to that of said interdigital transducer M by an angle $\alpha$, an interdigital periodicity $P_N$ along the vertical direction to the finger direction of said interdigital transducer R being equal to the product of said interdigital periodicity P and cos $\alpha$; and
   a phase shifter S including at least a coil $L_1$,
     said interdigital transducer M and said earth electrode G receiving an electric signal $V_1$ with a frequency approximately corresponding to said interdigital periodicity P between said electrode $M_1$ and said earth electrode G, and another electric signal $V_2$ with a frequency equal to that of said electric signal $V_1$ between said electrode $M_2$ and said earth electrode G via said phase shifter S, and exciting an unidirectional elastic wave in said piezoelectric substrate, said unidirectional elastic wave having the wavelength approximately equal to said interdigital periodicity P, the phase difference between said electric signals $V_1$ and $V_2$ being $2\pi y$,
     said interdigital transducer R transducing said elastic wave to electric signals $E_j$ (j=1, 2, . . . , X) with phases $\theta_j$ (j=1, 2, . . . , X), respectively, said phases $\theta_j$ corresponding to positions $F_j$(j=1, 2, . . . , X) on said upper- or lower end surface of said piezoelectric substrate, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at said interdigital transducer R p2 said interdigital transducers M and R forming minute propagation lanes $Z_j$ (j=1, 2, . . . , X) of the elastic wave in said piezoelectric substrate, said minute propagation lanes $R_j$ corresponding to said positions $F_j$,
     said interdigital transducer R delivering an electric signal E with a phase $\theta$ only when touching with a finger or others on a position $F_x$, out of said positions $F_j$, on a minute propagation lane $Z_x$ out of said minute propagation lanes $Z_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta_j$ minus said phase $\theta_x$ being equal to said phase $\theta$.

4. An elastic wave position-sensing device as defined in claim 3, wherein x<½ in a shorter distance xP of said two kinds of distances between one electrode finger of said electrode $M_1$ and two neighboring electrode fingers of said electrode $M_2$, and $x+y=\pm\frac{1}{2}$ in said phase difference $2\pi y$ between said electric signals $V_1$ and $V_2$.

5. An elastic wave position-sensing device as defined in claim 3, wherein an overlap length $L_P$ along the finger direction of said interdigital transducer R is equal to the product of an overlap length L of said interdigital transducer M and sec $\alpha$.

6. An elastic wave position-sensing device comprising:
a piezoelectric substrate having an upper- and a lower end surfaces running perpendicular to the direction of the thickness d thereof;
two elastic wave transducing units X and Y, each thereof consisting of
an input interdigital transducer $T_o$ formed on said upper end surface of said piezoelectric substrate,
N input interdigital transducers $T_i$ (i=1, 2, ..., N) formed on said upper end surface of said piezoelectric substrate,
an output interdigital transducer $R_o$ opposed to said interdigital transducer $T_o$ on said upper end surface of said piezoelectric substrate and placed such that the finger direction of said interdigital transducer $R_o$ runs parallel with that of said interdigital transducer $T_o$, said thickness d being smaller than an interdigital periodicity P of said interdigital transducers $T_o$, $T_i$ and $R_o$, and
at least two output interdigital transducers $R_{i1}$ and $R_{i2}$ (i=1, 2, ..., N) opposed to each interdigital transducer $T_i$ on said upper end surface of said piezoelectric substrate and placed such that the finger direction of said interdigital transducers $R_{i1}$ and $R_{i2}$ is slanting to that of said interdigital transducer $T_i$ by an angle $\alpha$, respectively, an interdigital periodicity $P_N$ along the vertical direction to the finger direction of said interdigital transducers $R_{i1}$ and $R_{i2}$ being equal to the product of said interdigital periodicity P and cos $\alpha$; and
a controlling system connected with said elastic wave transducing units X and Y,
each of said interdigital transducers $T_o$ and $T_i$ receiving an electric signal with a frequency approximately corresponding to said interdigital periodicity P, and exciting an elastic wave in said piezoelectric substrate, said elastic wave having the wavelength approximately equal to said interdigital periodicity P,
said interdigital transducer $R_o$ transducing said elastic wave excited by said interdigital transducer $T_o$ to an electric signal with a phase $\theta_{base}$ and delivering said electric signal,
each of said interdigital transducers $R_{i1}$ and $R_{i2}$ transducing said elastic wave excited by each interdigital transducer $T_i$ to electric signals $E_j$ (j=1, 2, ..., X) with phases $\theta_j$ (j=1, 2, ..., X), respectively, said phases $\theta_j$ corresponding to positions $F_j$ (j=1, 2, ..., X) on said upper- or lower end surface of said piezoelectric substrate, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$,
said interdigital transducers $T_i$ and $R_{i1}$ forming N propagation lanes $D_{i1}$ (i=1, 2, ..., N) of the elastic wave in said piezoelectric substrate, each propagation lane $D_{i1}$ consisting of minute propagation lanes $Z_j$ (j=1, 2, ..., X) corresponding to said positions $F_j$,
said interdigital transducers $T_i$ and $R_{i2}$ forming N propagation lanes $D_{i2}$ (i=1, 2, ..., N) of the elastic wave in said piezoelectric substrate, each propagation lane $D_{i1}$ consisting of minute propagation lanes $Z_j$ (j=1, 2, ..., X) corresponding to said positions $F_j$,
one of said interdigital transducers $R_{i1}$ and $R_{i2}$ delivering an electric signal E with a phase $\theta$ only when touching a position $F_x$, out of said positions $F_j$, on a minute propagation lane $Z_x$ out of said minute propagation lanes $Z_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta_j$ minus said phase $\theta_x$ being equal to said phase $\theta$,
said controlling system sensing a touch with a finger or others on said position $F_x$ by an appearance of said electric signal E at said one of said interdigital transducers $R_{i1}$ and $R_{i2}$, and finding said position $F_x$ by detecting said one, delivering said electric signal E, of said interdigital transducers $R_{i1}$ and $R_{i2}$, and by evaluating a difference between said phases $\theta$ and $\theta_{baseo}$.

7. An elastic wave position-sensing device as defined in claim 6 further comprising:
N switches $W_i$ (i=1, 2, ..., N) corresponding to said interdigital transducers $T_i$, an output terminal of each switch $W_i$ being connected with an input terminal of each interdigital transducer $T_i$,
output terminals of said interdigital transducers $R_{i1}$ being connected with each other at an output point $Q_1$,
output terminals of said interdigital transducers $R_{i2}$ being connected with each other at an output point $Q_2$,
said controlling system turning on and off said switches $W_i$ with a fixed period in turn, sensing a touch on said position $F_x$ by an appearance of said electric signal E at one of said output points $Q_2$ and $Q_2$, and finding said position $F_x$ by detecting said one, delivering said electric signal E, of said output points $Q_1$ and $Q_2$, by choosing a closed one out of said switches $W_i$ when said electric signal E appears, and by evaluating said difference between said phases $\theta$ and $\theta_{base}$.

8. An elastic wave position-sensing device as defined in claim 6, wherein the sum of an overlap length $L_P$ along the finger direction of said interdigital transducer $R_{i1}$ and that of said interdigital transducer $R_{i2}$ is approximately equal to the product of an overlap length L of said interdigital transducer $T_i$ and sec $\alpha$.

9. An elastic wave position-sensing device as defined in claim 6, wherein two neighbors of said propagation lanes $D_{i1}$ and $D_{i2}$ are closed or partially overlapping each other.

10. An elastic wave position-sensing device as defined in claim 6, wherein said propagation lanes $R_{i1}$ and $R_{i2}$ of said elastic wave transducing unit X and that of said elastic wave transducing unit Y are vertical to each other.

11. An elastic wave position-sensing device as defined in claim 6 further comprising:
an amplifier Ax, an input terminal of said interdigital transducer $R_o$ of said elastic wave transducing unit X being connected with each input terminal of said interdigital transducer $T_o$ of said elastic wave transducing units X and Y via said amplifier $A_x$,
said interdigital transducers $T_o$ and $R_o$ in said elastic wave transducing unit X, a propagation lane of an elastic wave between said interdigital transducers $T_o$ and $R_o$ in said elastic wave transducing unit X, and said amplifier $A_x$ forming an oscillator.

12. An elastic wave position-sensing device comprising:
a piezoelectric substrate having an upper- and a lower end surfaces running perpendicular to the direction of the thickness d thereof;
two elastic wave transducing units X and Y, each thereof consisting of
an input interdigital transducer $T_o$ formed on said upper end surface of said piezoelectric substrate,
N input interdigital transducers $M_i$ (i=1, 2, ..., N) formed on said upper end surface of said piezoelectric substrate, each interdigital transducer $M_{i1}$ consisting of two electrodes $M_{i\text{-}1}$ and $M_{i\text{-}2}$ and having two kinds of distances between one electrode finger of said electrode $M_{i\text{-}1}$ and two neighboring electrode fingers of said electrode $M_{i\text{-}2}$,
an output interdigital transducer $R_o$ opposed to said interdigital transducer $T_o$ on said upper end surface of said piezoelectric substrate and placed such that the finger direction of said interdigital transducer $R_o$ D runs parallel with that of said interdigital transducer $T_o$, said thickness d being smaller than an interdigital periodicity P of said interdigital transducers $T_o$, $M_{i1}$ and $R_o$,
at least two output interdigital transducers $R_{i1}$ and $R_{i2}$ (i=1, 2, ..., N) opposed to each interdigital transducer $M_i$ on said upper end surface of said piezoelectric substrate and placed such that the finger direction of said interdigital transducers $R_{i1}$ and $R_{i2}$ is slanting to that of said interdigital transducer $M_i$ by an angle $\alpha$, respectively, an interdigital periodicity $P_N$ along the vertical direction to the finger direction of said interdigital transducers $R_{i1}$ and $R_{i2}$ being equal to the product of said interdigital periodicity P and cos $\alpha$,
N earth electrodes $G_i$ (i=1, 2, ..., N) formed on said lower end surface of said piezoelectric substrate and corresponding with said interdigital transducers $M_i$, respectively, and
a phase shifter S including at least a coil $L_1$; and
a controlling system connected with said elastic wave transducing units X and Y,
said interdigital transducer $T_o$ receiving an electric signal with a frequency approximately corresponding to said interdigital periodicity P, and exciting an elastic wave in said piezoelectric substrate, said elastic wave having the wavelength approximately equal to said interdigital periodicity P,
said interdigital transducer $R_o$ transducing said elastic wave excited by said interdigital transducer $T_o$ to an electric signal with a phase $\theta_{base}$ and delivering said electric signal,
each interdigital transducer $M_i$ and each earth electrode $G_i$ receiving an electric signal $V_1$ with a frequency approximately corresponding to said interdigital periodicity P between said electrode $M_{i\text{-}1}$ and said earth electrode $G_i$, and another electric signal $V_2$ with a frequency equal to that of said electric signal $V_1$ between said electrode $M_{i\text{-}2}$ and said earth electrode $G_i$ via said phase shifter S, and exciting an unidirectional elastic wave in said piezoelectric substrate, said unidirectional elastic wave having the wavelength approximately equal to said interdigital periodicity P, the phase difference between said electric signals $V_1$ and $V_2$ being $2\pi y$, each of said interdigital transducers $R_{i1}$ and $R_{i2}$ transducing said elastic wave excited by each interdigital transducer $M_{i1}$ and each earth electrode $G_i$ to electric signals $E_j$ (j=1, 2, ..., X) with phases $\theta_j$ (j=1, 2, ..., X), respectively, said phases $\theta_j$ corresponding to positions $F_j$ (j=1, 2, ..., X) on said upper- or lower end surface of said piezoelectric substrate, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$,
said interdigital transducers $M_i$ and $R_{i1}$ forming N propagation lanes $D_{i1}$ (i=1, 2, ..., N) of the elastic wave in said piezoelectric substrate, each propagation lane $D_{i1}$ consisting of minute propagation lanes $Z_j$ (j=1, 2, ..., X) corresponding to said positions $F_j$,
said interdigital transducers $M_i$ and $R_{i2}$ forming N propagation lanes $D_{i2}$ (i=1, 2, ..., N) of the elastic wave in said piezoelectric substrate, each propagation lane $D_{i2}$ consisting of minute propagation lanes $Z_j$ (j=1, 2, ..., X) corresponding to said positions $F_j$,
one of said interdigital transducers $R_{i1}$ and $R_{i2}$ delivering an electric signal E with a phase $\theta$ only when touching a position $F_x$, out of said positions $F_j$, on a minute propagation lane $Z_x$ out of said minute propagation lanes $R_j$, said position $F_x$ corresponding to an electric signal $E_x$ with a phase $\theta_x$, said total electric signal $\Sigma E_j$ minus said electric signal $E_x$ being equal to said electric signal E, said total phase $\Sigma\theta_j$ minus said phase $\theta_x$ being equal to said phase $\theta$,
said controlling system sensing a touch with a finger or others on said position $F_x$ by an appearance of said electric signal E at said one of said interdigital transducers $R_{i1}$ and $R_{i2}$, and finding said position $F_x$ by detecting said one, delivering said electric signal E, of said interdigital transducers $R_{i1}$ and $R_{i2}$, and by evaluating a difference between said phases $\theta$ and $\theta_{base}$.

13. An elastic wave position-sensing device as defined in claim 12 further comprising:
N pairs of switches $W_i$ (i=1, 2, ..., N) corresponding to said interdigital transducers $M_i$, each pair of switches $W_i$ consisting of two switches $W_{i1}$ and $W_{i2}$, and output terminals of said switches $W_{i1}$ and $W_{i2}$ being connected with input terminals of said electrodes $M_{i\text{-}1}$ and $M_{i\text{-}2}$, respectively,
output terminals of said interdigital transducers $R_{i1}$ being connected with each other at an output point $Q_1$,
output terminals of said interdigital transducers $R_{i2}$ being connected with each other at an output point $Q_2$,
said controlling system turning on and off said switches $W_i$ with a fixed period in turn, sensing a touch on said position $F_x$ by an appearance of said electric signal E at one of said output points $Q_1$ and $Q_2$, and finding said position $F_x$ by detecting said one, delivering said electric signal E, of said output points $Q_1$ and $Q_2$, by choosing a closed one out of said switches $W_i$ when said electric signal E appears, and by evaluating said difference between said phases $\theta$ and $\theta_{base}$.

14. An elastic wave position-sensing device as defined in claim 12, wherein x<½ in a shorter distance xP of said two kinds of distances between one electrode finger of said electrode $M_{i-1}$ and two neighboring electrode fingers of said electrode $M_{i-2}$, and x+y=±½ in said phase difference 2Σy between said electric signals $V_1$ and $V_2$.

15. An elastic wave position-sensing device as defined in claim 12, wherein the sum of an overlap length $L_P$ along the finger direction of said interdigital transducer $R_{i1}$ and that of said interdigital transducer $R_{i2}$ is approximately equal to the product of an overlap length L of said interdigital transducer $M_i$ and sec α.

16. An elastic wave position-sensing device as defined in claim 12, wherein two neighbors of said propagation lanes $D_{i1}$ and $D_{i2}$ are closed or partially overlapping each other.

17. An elastic wave position-sensing device as defined in claim 12, wherein said propagation lanes $D_{i1}$ and $D_{i2}$ of said elastic wave transducing unit X and that of said elastic wave transducing unit Y are vertical to each other.

18. An elastic wave position-sensing device as defined in claim 12 further comprising:

an amplifier $A_x$, an input terminal of said interdigital transducer $R_o$ of said elastic wave transducing unit X being connected with each input terminal of said interdigital transducer $T_o$ of said elastic wave transducing units X and Y via said amplifier $A_x$, said interdigital transducers $T_o$ and $R_o$ in said elastic wave transducing unit X, a propagation lane of an elastic wave between said interdigital transducers $T_o$ and $R_o$ in said elastic wave transducing unit X, and said amplifier $A_x$ forming an oscillator.

19. An elastic wave position-sensing device as defined in claim 12, wherein said piezoelectric substrate is made of a piezoelectric ceramic, the polarization axis thereof being parallel to the thickness direction thereof.

20. An elastic wave position-sensing device as defined in claim 12, wherein said piezoelectric substrate is made of a piezoelectric polymer such as PVDF and so on.

* * * * *